(12) United States Patent
Yorav Raphael et al.

(10) Patent No.: US 12,393,010 B2
(45) Date of Patent: Aug. 19, 2025

(54) DISTINGUISHING BETWEEN ENTITIES IN A BLOOD SAMPLE

(71) Applicant: S.D. Sight Diagnostics Ltd., Tel Aviv (IL)

(72) Inventors: Noam Yorav Raphael, Tekoa (IL); Yuval Greenfield, Sunnyvale, CA (US); Joseph Joel Pollak, Neve Daniel (IL); Yonatan Bilu, Jerusalem (IL)

(73) Assignee: S.D. Sight Diagnostics Ltd., Tel Aviv (IL)

( * ) Notice: Subject to any disclaimer, the term of this patent is extended or adjusted under 35 U.S.C. 154(b) by 0 days.

(21) Appl. No.: 17/063,320

(22) Filed: Oct. 5, 2020

(65) Prior Publication Data

US 2021/0018743 A1 Jan. 21, 2021

Related U.S. Application Data

(63) Continuation of application No. 14/914,329, filed as application No. PCT/IL2014/050770 on Aug. 26, 2014, now Pat. No. 10,831,013.

(Continued)

(51) Int. Cl.
*G02B 21/36* (2006.01)
*G02B 7/38* (2021.01)
(Continued)

(52) U.S. Cl.
CPC .......... *G02B 21/367* (2013.01); *G02B 7/38* (2013.01); *G02B 21/241* (2013.01); *G02B 21/244* (2013.01); *G02B 21/26* (2013.01)

(58) Field of Classification Search
CPC ...... G02B 21/367; G02B 21/244; G02B 7/38; G02B 21/241; G02B 21/26
(Continued)

(56) References Cited

U.S. PATENT DOCUMENTS

| | | |
|---|---|---|
| 3,203,768 A | 8/1965 | Tiller et al. |
| 3,603,156 A | 9/1971 | Konkol |

(Continued)

FOREIGN PATENT DOCUMENTS

| | | |
|---|---|---|
| CA | 2655024 C | 11/2014 |
| CN | 1918501 A1 | 2/2007 |

(Continued)

OTHER PUBLICATIONS

Guy, Rebecca, Paul Liu, Peter Pennefather and Ian Crandall, "The use of fluorescence enhancement to improve the microscopic diagnosis of falciparum malaria", Malaria Journal 2007 6:89, https://malariajournal.biomedcentral.com/articles/10.1186/1475-2875-6-89, (Jul. 9, 2007) (total 8 pages).

(Continued)

*Primary Examiner* — Loi H Tran

(74) *Attorney, Agent, or Firm* — Sughrue Mion, PLLC

(57) ABSTRACT

Apparatus and methods are described including a microscope system configured to acquire first and second images of a blood sample at respective times. A computer processor determines whether, between acquisitions of the first and second images, there was motion of a given entity within the sample, by comparing the first and second images to one another. At least partially in response thereto, the computer processor distinguishes between the given entity being a non-parasitic entity and the given entity being a parasite, and generates an output on the output device, at least partially in response thereto. Other applications are also described.

12 Claims, 7 Drawing Sheets

Related U.S. Application Data

(60) Provisional application No. 61/870,106, filed on Aug. 26, 2013.

(51) Int. Cl.
*G02B 21/24* (2006.01)
*G02B 21/26* (2006.01)

(58) Field of Classification Search
USPC .................................................. 348/79
See application file for complete search history.

(56) References Cited

U.S. PATENT DOCUMENTS

| | | |
|---|---|---|
| 3,676,076 A | 7/1972 | Grady |
| 3,786,184 A | 1/1974 | Pieters |
| 3,916,205 A | 10/1975 | Kleinerman |
| 3,967,056 A | 6/1976 | Yata et al. |
| 4,030,888 A | 6/1977 | Yamamoto |
| 4,076,419 A | 2/1978 | Kleker |
| 4,097,845 A | 6/1978 | Bacus |
| 4,199,748 A | 4/1980 | Bacus |
| 4,209,548 A | 6/1980 | Bacus |
| 4,350,884 A | 9/1982 | Dieter |
| 4,453,266 A | 6/1984 | Bacus |
| 4,454,235 A | 6/1984 | Johnson |
| 4,494,479 A | 1/1985 | Drury et al. |
| 4,580,895 A | 4/1986 | Patel |
| 4,700,298 A | 10/1987 | Palcic et al. |
| 4,761,381 A | 8/1988 | Blatt et al. |
| 4,774,192 A | 9/1988 | Terminiello et al. |
| 4,849,340 A | 7/1989 | Oberhardt |
| 4,849,430 A | 7/1989 | Fleet |
| 4,851,330 A | 7/1989 | Kohne |
| 4,902,101 A | 2/1990 | Fujihara et al. |
| 5,001,067 A | 3/1991 | Coleman et al. |
| 5,064,282 A | 11/1991 | Curtis |
| 5,229,265 A | 7/1993 | Tometsko |
| 5,281,517 A | 1/1994 | Bacus et al. |
| 5,300,779 A | 4/1994 | Hillman et al. |
| 5,331,958 A | 7/1994 | Oppenheimer |
| 5,376,790 A | 12/1994 | Linker et al. |
| 5,430,542 A | 7/1995 | Shepherd et al. |
| 5,470,751 A | 11/1995 | Sakata |
| 5,499,097 A * | 3/1996 | Ortyn .................... G02B 21/26 356/615 |
| 5,566,249 A | 10/1996 | Rosenlof et al. |
| 5,625,706 A | 4/1997 | Lee et al. |
| 5,663,057 A | 9/1997 | Drocourt |
| 5,671,288 A | 9/1997 | Wilhelm et al. |
| 5,672,861 A | 9/1997 | Fairley et al. |
| 5,674,457 A | 10/1997 | Williamsson et al. |
| 5,745,804 A | 4/1998 | Iwane |
| 5,782,770 A | 7/1998 | Mooradian et al. |
| 5,784,162 A | 7/1998 | Cabib et al. |
| 5,827,190 A | 10/1998 | Palcic et al. |
| 5,834,217 A | 11/1998 | Levine et al. |
| 5,932,872 A | 8/1999 | Price |
| 5,939,709 A | 8/1999 | Ghislain et al. |
| 5,948,686 A | 9/1999 | Wardlaw |
| 5,978,497 A | 11/1999 | Lee et al. |
| 5,985,595 A | 11/1999 | Krider et al. |
| 5,993,702 A | 11/1999 | Davis |
| 6,005,964 A | 12/1999 | Reid |
| 6,027,695 A | 2/2000 | Oldenburg et al. |
| 6,064,474 A | 5/2000 | Lee et al. |
| 6,074,789 A | 6/2000 | Zelmnanovic et al. |
| 6,101,404 A | 8/2000 | Yoon et al. |
| 6,235,536 B1 | 5/2001 | Wardlaw |
| 6,262,423 B1 | 7/2001 | Hell et al. |
| 6,262,798 B1 | 7/2001 | Shepherd et al. |
| 6,320,979 B1 | 11/2001 | Melen |
| 6,330,348 B1 | 12/2001 | Kerschmann et al. |
| 6,339,472 B1 | 1/2002 | Hafeman |
| 6,350,613 B1 | 2/2002 | Wardlaw et al. |
| 6,448,024 B1 | 9/2002 | Bruegger |
| 6,519,355 B2 | 2/2003 | Nelson |
| 6,538,249 B1 | 3/2003 | Takane et al. |
| 6,554,788 B1 | 4/2003 | Kenneth et al. |
| 6,582,964 B1 | 6/2003 | Samsoondar et al. |
| 6,611,777 B2 | 8/2003 | Samsoondar |
| 6,632,681 B1 | 10/2003 | Chu |
| 6,658,143 B2 | 12/2003 | Hansen et al. |
| 6,664,528 B1 | 12/2003 | Cartlidge et al. |
| 6,711,516 B2 | 3/2004 | Samsoondar |
| 6,799,119 B1 | 9/2004 | Voorhees et al. |
| 6,819,408 B1 | 11/2004 | Scrivens et al. |
| 6,831,733 B2 | 12/2004 | Pettersson et al. |
| 6,834,237 B2 | 12/2004 | Noergaard et al. |
| 6,836,559 B2 | 12/2004 | Abdel-Fattah et al. |
| 6,842,233 B2 | 1/2005 | Narisada et al. |
| 6,866,823 B2 | 3/2005 | Wardlaw |
| 6,872,930 B2 | 3/2005 | Cartlidge et al. |
| 6,898,451 B2 | 5/2005 | Wuori |
| 6,903,323 B2 | 6/2005 | Cartlidge et al. |
| 6,929,953 B1 | 8/2005 | Wardlaw |
| 6,949,384 B2 | 9/2005 | Samsoondar |
| 6,955,872 B2 | 10/2005 | Maples et al. |
| 6,956,650 B2 | 10/2005 | Boas et al. |
| 6,989,891 B2 | 1/2006 | Braig et al. |
| 7,027,628 B1 | 4/2006 | Gagnon et al. |
| 7,030,351 B2 | 4/2006 | Wasserman et al. |
| 7,034,883 B1 | 4/2006 | Rosenqvist |
| 7,105,795 B2 | 9/2006 | Cartlidge et al. |
| 7,132,636 B1 | 11/2006 | Cartlidge et al. |
| 7,133,547 B2 | 11/2006 | Marcelpoil et al. |
| 7,151,246 B2 | 12/2006 | Fein et al. |
| 7,155,049 B2 | 12/2006 | Wetzel et al. |
| 7,214,936 B2 | 5/2007 | Sato et al. |
| 7,248,716 B2 | 7/2007 | Fein et al. |
| 7,274,810 B2 | 9/2007 | Reeves et al. |
| 7,283,217 B2 | 10/2007 | Ikeuchi et al. |
| 7,288,751 B2 | 10/2007 | Cartlidge et al. |
| 7,305,109 B1 | 12/2007 | Gagnon et al. |
| 7,324,694 B2 | 1/2008 | Chapoulaud et al. |
| 7,329,537 B2 | 2/2008 | Qiu |
| 7,338,168 B2 | 3/2008 | Cartlidge et al. |
| 7,344,890 B2 | 3/2008 | Perez et al. |
| 7,346,205 B2 | 3/2008 | Walker, Jr. |
| 7,369,696 B2 | 5/2008 | Arini et al. |
| 7,385,168 B2 | 6/2008 | Cartlidge et al. |
| 7,387,898 B1 | 6/2008 | Gordon |
| 7,411,680 B2 | 8/2008 | Chang et al. |
| 7,417,213 B2 | 8/2008 | Krief et al. |
| 7,425,421 B2 | 9/2008 | Dertinger |
| 7,439,478 B2 | 10/2008 | Cartlidge et al. |
| 7,450,223 B2 | 11/2008 | Ikeuchi et al. |
| 7,450,762 B2 | 11/2008 | Morell |
| 7,460,222 B2 | 12/2008 | Kalveram et al. |
| 7,490,085 B2 | 2/2009 | Walker et al. |
| 7,493,219 B1 | 2/2009 | Qi et al. |
| 7,580,120 B2 | 8/2009 | Hamada et al. |
| 7,599,893 B2 | 10/2009 | Sapir et al. |
| 7,601,938 B2 | 10/2009 | Cartlidge et al. |
| 7,602,954 B2 | 10/2009 | Marcelpoil et al. |
| 7,605,356 B2 | 10/2009 | Krief et al. |
| 7,609,369 B2 | 10/2009 | Simon-Lopez |
| 7,630,063 B2 | 12/2009 | Padmanabhan et al. |
| 7,633,604 B2 | 12/2009 | Ikeuchi et al. |
| 7,638,748 B2 | 12/2009 | Krief et al. |
| 7,663,738 B2 | 2/2010 | Johansson |
| 7,668,362 B2 | 2/2010 | Olson et al. |
| 7,692,131 B2 | 4/2010 | Fein et al. |
| 7,697,764 B2 | 4/2010 | Kataoka |
| 7,702,181 B2 | 4/2010 | Gouch |
| 7,706,862 B2 | 4/2010 | Alfano |
| 7,713,474 B2 | 5/2010 | Schulman et al. |
| 7,747,153 B2 | 6/2010 | Ibaraki |
| 7,765,069 B2 | 7/2010 | Ostoich et al. |
| 7,777,869 B2 | 8/2010 | Nerin et al. |
| 7,787,109 B2 | 8/2010 | Dosmann et al. |
| 7,796,797 B2 | 9/2010 | Nakaya et al. |
| 7,863,552 B2 | 1/2011 | Cartlidge et al. |
| 7,869,009 B2 | 1/2011 | Dosmann et al. |

(56) References Cited

U.S. PATENT DOCUMENTS

| | | |
|---|---|---|
| 7,894,047 B2 | 2/2011 | Hamada et al. |
| 7,911,617 B2 | 3/2011 | Padmanabhan |
| 7,925,070 B2 | 4/2011 | Sumida et al. |
| 7,929,121 B2 | 4/2011 | Wardlaw et al. |
| 7,933,435 B2 | 4/2011 | Hunter et al. |
| 7,936,913 B2 | 5/2011 | Nordell et al. |
| 7,951,599 B2 | 5/2011 | Levine et al. |
| 7,995,200 B2 | 8/2011 | Matsumoto |
| 8,000,511 B2 | 8/2011 | Perz |
| 8,044,974 B2 | 10/2011 | Sumida et al. |
| 8,045,782 B2 | 10/2011 | Li et al. |
| 8,055,471 B2 | 11/2011 | Qi et al. |
| 8,064,680 B2 | 11/2011 | Ramoser et al. |
| 8,077,296 B2 | 12/2011 | Wardlaw et al. |
| 8,081,303 B2 | 12/2011 | Levine et al. |
| 8,105,554 B2 | 1/2012 | Kanigan et al. |
| 8,125,643 B2 | 2/2012 | Hansen et al. |
| D655,421 S | 3/2012 | Lee et al. |
| 8,131,035 B2 | 3/2012 | Grady et al. |
| 8,131,052 B2 | 3/2012 | Alexandrov |
| 8,150,114 B2 | 4/2012 | Svanberg et al. |
| 8,154,713 B2 | 4/2012 | Simon-Lopez |
| 8,165,385 B2 | 4/2012 | Reeves et al. |
| 8,175,353 B2 | 5/2012 | Westphal et al. |
| 8,179,597 B2 | 5/2012 | Namba et al. |
| 8,184,273 B2 | 5/2012 | Dosmann et al. |
| 8,192,995 B2 | 6/2012 | Zhang et al. |
| 8,216,832 B2 | 7/2012 | Battrell et al. |
| 8,224,058 B2 | 7/2012 | Lindberg et al. |
| 8,269,954 B2 | 9/2012 | Levine et al. |
| 8,280,134 B2 | 10/2012 | Hoyt |
| 8,310,659 B2 | 11/2012 | Wardlaw et al. |
| 8,314,837 B2 | 11/2012 | Kenny et al. |
| 8,320,655 B2 | 11/2012 | Sarachan et al. |
| 8,327,724 B2 | 12/2012 | Fairs et al. |
| 8,331,627 B2 | 12/2012 | Xiong et al. |
| 8,331,642 B2 | 12/2012 | Zerfass et al. |
| 8,339,586 B2 | 12/2012 | Zahniser et al. |
| 8,345,227 B2 | 1/2013 | Zahniser et al. |
| 8,351,676 B2 | 1/2013 | Dai et al. |
| 8,363,221 B2 | 1/2013 | Hansen et al. |
| 8,379,944 B2 | 2/2013 | Grady et al. |
| 8,406,498 B2 | 3/2013 | Ortyn et al. |
| 8,428,331 B2 | 4/2013 | DiMarzio et al. |
| 8,432,392 B2 | 4/2013 | Kim et al. |
| 8,477,294 B2 | 7/2013 | Zahniser et al. |
| 8,481,303 B2 | 7/2013 | Faris et al. |
| 8,488,111 B2 | 7/2013 | Zahniser et al. |
| 8,491,499 B2 | 7/2013 | Choi et al. |
| 8,526,704 B2 | 9/2013 | Dobbe |
| 8,565,480 B2 | 10/2013 | Eichhorn et al. |
| 8,570,496 B2 | 10/2013 | Chen |
| 8,582,924 B2 | 11/2013 | De La Torre-Bueno et al. |
| 8,638,427 B2 | 1/2014 | Wardlaw et al. |
| 8,712,142 B2 | 4/2014 | Rajpoot et al. |
| 8,736,824 B2 | 5/2014 | Matsui et al. |
| 8,744,165 B2 | 6/2014 | Liu et al. |
| 8,778,687 B2 | 7/2014 | Levine et al. |
| 8,787,650 B2 | 7/2014 | Muragame |
| 8,792,693 B2 | 7/2014 | Satish et al. |
| 8,837,803 B2 | 9/2014 | Wang et al. |
| 8,849,024 B2 | 9/2014 | Shinoda et al. |
| 8,873,827 B2 | 10/2014 | McCulloch et al. |
| 8,877,458 B2 | 11/2014 | Maurer |
| 8,878,923 B2 | 11/2014 | Henderson et al. |
| 8,885,154 B2 | 11/2014 | Wardlaw et al. |
| 8,885,912 B2 | 11/2014 | Sui |
| 8,891,851 B2 | 11/2014 | Spaulding |
| 8,922,761 B2 | 12/2014 | Zahniser et al. |
| 8,942,458 B2 | 1/2015 | Takahashi et al. |
| 8,964,171 B2 | 2/2015 | Zahniser et al. |
| 8,992,750 B1 | 3/2015 | Beaty |
| 8,994,930 B2 | 3/2015 | Levine et al. |
| 9,012,868 B2 | 4/2015 | Courtney et al. |
| 9,041,792 B2 | 5/2015 | Van Leeuwen et al. |
| 9,046,473 B2 | 6/2015 | Levine et al. |
| 9,050,595 B2 | 6/2015 | Miller et al. |
| 9,064,301 B2 | 6/2015 | Xie et al. |
| 9,088,729 B2 | 7/2015 | Takayama |
| 9,176,121 B2 | 11/2015 | Winkelman et al. |
| 9,186,843 B2 | 11/2015 | Chan et al. |
| 9,233,767 B2 | 1/2016 | Amano et al. |
| 9,235,041 B2 | 1/2016 | Crandall |
| 9,240,043 B2 | 1/2016 | Christiansen et al. |
| 9,329,129 B2 | 5/2016 | Pollak et al. |
| 9,332,190 B2 | 5/2016 | Murakami |
| 9,342,734 B2 | 5/2016 | Lin et al. |
| 9,349,208 B2 | 5/2016 | Eichhorn |
| 9,404,852 B2 | 8/2016 | Braig et al. |
| 9,470,609 B2 | 10/2016 | Wimberger-Friedl et al. |
| 9,477,875 B2 | 10/2016 | Ohya et al. |
| 9,522,396 B2 | 12/2016 | Bachelet et al. |
| 9,528,978 B2 | 12/2016 | Yamada |
| 9,588,033 B2 | 3/2017 | Zahniser et al. |
| 9,690,974 B2 | 6/2017 | Obrien et al. |
| 9,767,343 B1 | 9/2017 | Jones et al. |
| 9,820,990 B2 | 11/2017 | Pak |
| 9,930,241 B2 | 3/2018 | Oshima et al. |
| 9,933,363 B2 | 4/2018 | Danuser et al. |
| 9,934,571 B2 | 4/2018 | Ozaki et al. |
| 9,976,945 B2 | 5/2018 | Kendall et al. |
| 10,024,858 B2 | 7/2018 | Smith et al. |
| 10,061,972 B2 | 8/2018 | Champlin et al. |
| 10,093,957 B2 | 10/2018 | Pollak et al. |
| 10,132,738 B2 | 11/2018 | Obrien et al. |
| 10,139,613 B2 | 11/2018 | Hing et al. |
| 10,169,861 B2 | 1/2019 | Ozaki et al. |
| 10,176,565 B2 | 1/2019 | Greenfield et al. |
| 10,210,376 B2 | 2/2019 | Hedlund et al. |
| 10,217,219 B2 | 2/2019 | Rimm et al. |
| 10,269,094 B2 | 4/2019 | Fuchs |
| 10,281,386 B2 | 5/2019 | Hsu et al. |
| 10,330,910 B2 | 6/2019 | Iwase et al. |
| 10,353,190 B2 | 7/2019 | Hulsken et al. |
| 10,395,368 B2 | 8/2019 | Berezhna et al. |
| 10,482,595 B2 | 11/2019 | Yorav-Raphael et al. |
| 10,488,644 B2 | 11/2019 | Eshel et al. |
| 10,508,983 B2 | 12/2019 | Kendall et al. |
| 10,527,635 B1 | 1/2020 | Bhatia et al. |
| 10,640,807 B2 | 5/2020 | Pollak et al. |
| 10,663,712 B2 | 5/2020 | Eshel et al. |
| 10,843,190 B2 | 11/2020 | Bachelet et al. |
| 11,099,175 B2 | 8/2021 | Zait et al. |
| 11,199,690 B2 | 12/2021 | Eshel et al. |
| 11,207,836 B2 | 12/2021 | Ramos et al. |
| 11,609,413 B2 | 3/2023 | Yorav-Raphael et al. |
| 2002/0009711 A1 | 1/2002 | Wada et al. |
| 2002/0028158 A1 | 3/2002 | Wardlaw |
| 2002/0028471 A1 | 3/2002 | Oberhardt |
| 2003/0017085 A1 | 1/2003 | Kercso et al. |
| 2003/0161514 A1 | 8/2003 | Curry |
| 2003/0170613 A1 | 9/2003 | Straus |
| 2003/0197925 A1 | 10/2003 | Hamborg |
| 2003/0208140 A1 | 11/2003 | Pugh |
| 2003/0224522 A1 | 12/2003 | de Jong et al. |
| 2003/0227612 A1 | 12/2003 | Fein et al. |
| 2003/0227673 A1 | 12/2003 | Nakagawa |
| 2003/0228038 A1 | 12/2003 | Douglass et al. |
| 2003/0231791 A1 | 12/2003 | Torre-Bueno et al. |
| 2004/0004614 A1 | 1/2004 | Bacus et al. |
| 2004/0054283 A1 | 3/2004 | Corey et al. |
| 2004/0122216 A1 | 6/2004 | Nielsen |
| 2004/0132171 A1 | 7/2004 | Rule et al. |
| 2004/0170312 A1 | 9/2004 | Soenksen |
| 2004/0185447 A1 | 9/2004 | Maples et al. |
| 2004/0218804 A1 | 11/2004 | Affleck et al. |
| 2004/0240050 A1 | 12/2004 | Ogihara |
| 2004/0241677 A1* | 12/2004 | Lin ................ G06T 7/0012 435/6.12 |
| 2004/0256538 A1 | 12/2004 | Olson et al. |
| 2005/0089208 A1 | 4/2005 | Dong |
| 2005/0109959 A1 | 5/2005 | Wasserman et al. |
| 2005/0117204 A1 | 6/2005 | Kinoshita et al. |
| 2005/0175992 A1 | 8/2005 | Aberl |

(56) References Cited

U.S. PATENT DOCUMENTS

| | | |
|---|---|---|
| 2005/0270611 A1 | 12/2005 | Oshiro et al. |
| 2005/0282292 A1 | 12/2005 | Torre-Bueno |
| 2005/0286800 A1 | 12/2005 | Gouch |
| 2006/0001955 A1 | 1/2006 | Kinney et al. |
| 2006/0002817 A1 | 1/2006 | Bohm et al. |
| 2006/0003458 A1 | 1/2006 | Golovchenko |
| 2006/0007345 A1 | 1/2006 | Olson et al. |
| 2006/0045505 A1 | 3/2006 | Zeineh et al. |
| 2006/0051778 A1 | 3/2006 | Kallick |
| 2006/0063185 A1 | 3/2006 | Vannier |
| 2006/0079144 A1 | 4/2006 | Klisch et al. |
| 2006/0098861 A1 | 5/2006 | See et al. |
| 2006/0187442 A1 | 8/2006 | Chang et al. |
| 2006/0190226 A1 | 8/2006 | Jojic |
| 2006/0210428 A1 | 9/2006 | Lindberg et al. |
| 2006/0222567 A1 | 10/2006 | Kloepfer |
| 2006/0223052 A1 | 10/2006 | McDonald et al. |
| 2006/0223165 A1 | 10/2006 | Chang et al. |
| 2006/0226362 A1 | 10/2006 | Kitsuki et al. |
| 2007/0054350 A1 | 3/2007 | Walker |
| 2007/0076190 A1 | 4/2007 | Nakaya et al. |
| 2007/0161075 A1 | 7/2007 | Gleich |
| 2007/0172956 A1 | 7/2007 | Magari et al. |
| 2007/0231914 A1 | 10/2007 | Deng et al. |
| 2007/0243117 A1 | 10/2007 | Wardlaw |
| 2007/0250301 A1 | 10/2007 | Vaisberg et al. |
| 2007/0252984 A1 | 11/2007 | Van Beek et al. |
| 2008/0002868 A1 | 1/2008 | Ando et al. |
| 2008/0012978 A1 | 1/2008 | Wang |
| 2008/0019584 A1 | 1/2008 | Lindberg et al. |
| 2008/0020128 A1 | 1/2008 | van Ryper et al. |
| 2008/0059135 A1 | 3/2008 | Murugkar et al. |
| 2008/0118399 A1 | 5/2008 | Fleming |
| 2008/0153098 A1 | 6/2008 | Rimm et al. |
| 2008/0187466 A1 | 8/2008 | Wardlaw |
| 2008/0212069 A1 | 9/2008 | Goldberg et al. |
| 2008/0260369 A1 | 10/2008 | Ibaraki |
| 2008/0273776 A1 | 11/2008 | Krief |
| 2008/0305514 A1 | 12/2008 | Alford et al. |
| 2009/0046909 A1 | 2/2009 | Rutenberg et al. |
| 2009/0066934 A1 | 3/2009 | Gao et al. |
| 2009/0074282 A1 | 3/2009 | Pinard et al. |
| 2009/0075324 A1 | 3/2009 | Pettersson |
| 2009/0086314 A1 | 4/2009 | Namba |
| 2009/0088336 A1 | 4/2009 | Burd et al. |
| 2009/0128618 A1 | 5/2009 | Fahn et al. |
| 2009/0185734 A1 | 7/2009 | Lindberg et al. |
| 2009/0191098 A1 | 7/2009 | Beard et al. |
| 2009/0195688 A1 | 8/2009 | Henderson |
| 2009/0213214 A1 | 8/2009 | Yamada |
| 2009/0238437 A1 | 9/2009 | Levine et al. |
| 2009/0258347 A1 | 10/2009 | Scott |
| 2009/0269799 A1 | 10/2009 | Winkelman et al. |
| 2009/0291854 A1 | 11/2009 | Wiesinger-Mayr et al. |
| 2010/0003265 A1 | 1/2010 | Scheffler et al. |
| 2010/0068747 A1 | 3/2010 | Herrenknecht |
| 2010/0104169 A1 | 4/2010 | Yamada |
| 2010/0112631 A1 | 5/2010 | Hur et al. |
| 2010/0120129 A1 | 5/2010 | Amshey et al. |
| 2010/0136556 A1 | 6/2010 | Friedberger |
| 2010/0136570 A1 | 6/2010 | Goldberg et al. |
| 2010/0152054 A1 | 6/2010 | Love et al. |
| 2010/0157086 A1 | 6/2010 | Segale et al. |
| 2010/0172020 A1 | 7/2010 | Price et al. |
| 2010/0192706 A1 | 8/2010 | Fairs |
| 2010/0232675 A1 | 9/2010 | Ortyn et al. |
| 2010/0234703 A1 | 9/2010 | Sterling et al. |
| 2010/0253907 A1 | 10/2010 | Korb |
| 2010/0254596 A1 | 10/2010 | Xiong et al. |
| 2010/0256918 A1 | 10/2010 | Chen et al. |
| 2010/0265323 A1 | 10/2010 | Perz |
| 2010/0272334 A1 | 10/2010 | Yamada et al. |
| 2010/0295998 A1 | 11/2010 | Sakai |
| 2010/0300563 A1 | 12/2010 | Ramunas et al. |
| 2011/0007178 A1 | 1/2011 | Kahlman |
| 2011/0009163 A1 | 1/2011 | Fletcher et al. |
| 2011/0030458 A1 | 2/2011 | Paark et al. |
| 2011/0059481 A1 | 3/2011 | Wardlaw et al. |
| 2011/0102571 A1 | 5/2011 | Yoneyama |
| 2011/0123398 A1 | 5/2011 | Carrilho et al. |
| 2011/0144480 A1 | 6/2011 | Lu et al. |
| 2011/0149097 A1 | 6/2011 | Danuser et al. |
| 2011/0151502 A1 | 6/2011 | Kendall et al. |
| 2011/0178716 A1 | 7/2011 | Krockenberger et al. |
| 2011/0212486 A1 | 9/2011 | Yamada et al. |
| 2011/0243794 A1 | 10/2011 | Wardlaw |
| 2011/0249910 A1 | 10/2011 | Henderson et al. |
| 2011/0260055 A1 | 10/2011 | Wang et al. |
| 2011/0275111 A1 | 11/2011 | Pettigrew et al. |
| 2011/0301012 A1* | 12/2011 | Dolecek ............... B04B 5/0442 494/10 |
| 2012/0002195 A1 | 1/2012 | Wu et al. |
| 2012/0007977 A1 | 1/2012 | Yamamoto et al. |
| 2012/0013727 A1 | 1/2012 | Breniman et al. |
| 2012/0021951 A1 | 1/2012 | Hess et al. |
| 2012/0030618 A1 | 2/2012 | Leong et al. |
| 2012/0044342 A1 | 2/2012 | Hing et al. |
| 2012/0058504 A1 | 3/2012 | Li et al. |
| 2012/0120221 A1 | 5/2012 | Dong et al. |
| 2012/0162495 A1 | 6/2012 | Ogawa |
| 2012/0169863 A1* | 7/2012 | Bachelet ............... G01N 21/23 348/79 |
| 2012/0225446 A1 | 9/2012 | Wimberger-Friedl et al. |
| 2012/0237107 A1 | 9/2012 | Tawfik et al. |
| 2012/0249770 A1 | 10/2012 | Hamm et al. |
| 2012/0275671 A1 | 11/2012 | Eichhorn et al. |
| 2012/0288157 A1 | 11/2012 | Kishima |
| 2012/0312957 A1 | 12/2012 | Loney et al. |
| 2012/0320045 A1 | 12/2012 | Yao et al. |
| 2013/0016885 A1 | 1/2013 | Tsujimoto |
| 2013/0023007 A1 | 1/2013 | Zahniser et al. |
| 2013/0078668 A1 | 3/2013 | Levine et al. |
| 2013/0100272 A1 | 4/2013 | Price et al. |
| 2013/0130262 A1 | 5/2013 | Battrell et al. |
| 2013/0169948 A1 | 7/2013 | Xie et al. |
| 2013/0170730 A1 | 7/2013 | Yu et al. |
| 2013/0176551 A1 | 7/2013 | Wardlaw et al. |
| 2013/0177974 A1 | 7/2013 | Mamghani et al. |
| 2013/0203082 A1 | 8/2013 | Gonda et al. |
| 2013/0236566 A1 | 9/2013 | Higgins |
| 2013/0258058 A1 | 10/2013 | Wanatabe et al. |
| 2013/0273968 A1 | 10/2013 | Rhoads et al. |
| 2013/0284924 A1 | 10/2013 | Mizuochi et al. |
| 2013/0290225 A1 | 10/2013 | Kamath et al. |
| 2013/0323757 A1 | 12/2013 | Poher |
| 2013/0342902 A1 | 12/2013 | Krueger et al. |
| 2014/0139625 A1 | 5/2014 | Mathuis et al. |
| 2014/0139630 A1 | 5/2014 | Kowalevicz |
| 2014/0185906 A1 | 7/2014 | Ding et al. |
| 2014/0186859 A1 | 7/2014 | Calderwood et al. |
| 2014/0205176 A1* | 7/2014 | Obrien ............... G06V 10/10 382/133 |
| 2014/0270425 A1 | 9/2014 | Kenny et al. |
| 2014/0273064 A1 | 9/2014 | Smith et al. |
| 2014/0273076 A1 | 9/2014 | Adams et al. |
| 2014/0322750 A1 | 10/2014 | Matsumoto et al. |
| 2014/0347459 A1 | 11/2014 | Greenfield et al. |
| 2014/0347463 A1 | 11/2014 | Lin |
| 2014/0353524 A1 | 12/2014 | Danuser et al. |
| 2015/0006105 A1 | 1/2015 | Zhou et al. |
| 2015/0022882 A1 | 1/2015 | Ue et al. |
| 2015/0029508 A1 | 1/2015 | Toyoda et al. |
| 2015/0037806 A1* | 2/2015 | Pollak ............... G01N 1/30 435/6.15 |
| 2015/0050643 A1 | 2/2015 | Matsumoto et al. |
| 2015/0124082 A1 | 5/2015 | Kato et al. |
| 2015/0168705 A1 | 6/2015 | O'Neill |
| 2015/0183153 A1 | 7/2015 | Chan et al. |
| 2015/0185459 A1 | 7/2015 | Clark et al. |
| 2015/0190063 A1 | 7/2015 | Zakharov et al. |
| 2015/0246170 A1 | 9/2015 | Miao et al. |
| 2015/0278575 A1 | 10/2015 | Allano et al. |
| 2015/0302237 A1 | 10/2015 | Ohya et al. |
| 2015/0316477 A1 | 11/2015 | Pollak et al. |

(56) References Cited

U.S. PATENT DOCUMENTS

| | | |
|---|---|---|
| 2016/0042507 A1 | 2/2016 | Turner |
| 2016/0146750 A1 | 5/2016 | Hughes et al. |
| 2016/0168614 A1 | 6/2016 | Hunt |
| 2016/0187235 A1 | 6/2016 | Fine |
| 2016/0202460 A1 | 7/2016 | Zheng |
| 2016/0208306 A1 | 7/2016 | Pollak et al. |
| 2016/0246046 A1 | 8/2016 | Yorav Raphael et al. |
| 2016/0250312 A1 | 9/2016 | Longley |
| 2016/0279633 A1 | 9/2016 | Bachelet et al. |
| 2017/0003490 A1 | 1/2017 | Sueki et al. |
| 2017/0052110 A1 | 2/2017 | Malissek et al. |
| 2017/0115271 A1 | 4/2017 | Xie et al. |
| 2017/0146558 A1 | 5/2017 | Ishii et al. |
| 2017/0160185 A1 | 6/2017 | Minemura et al. |
| 2017/0191945 A1 | 7/2017 | Zhang et al. |
| 2017/0205612 A1 | 7/2017 | Carloni |
| 2017/0218425 A1 | 8/2017 | Chen et al. |
| 2017/0292905 A1 | 10/2017 | Obrien et al. |
| 2017/0307496 A1 | 10/2017 | Zahniser et al. |
| 2017/0326549 A1 | 11/2017 | Jones et al. |
| 2017/0328924 A1 | 11/2017 | Jones et al. |
| 2018/0080885 A1 | 3/2018 | Ginsberg et al. |
| 2018/0156713 A1 | 6/2018 | Berezhna |
| 2018/0171404 A1 | 6/2018 | Del Favero et al. |
| 2018/0246313 A1 | 8/2018 | Eshel et al. |
| 2018/0259318 A1 | 9/2018 | Yelin et al. |
| 2018/0296102 A1 | 10/2018 | Satish et al. |
| 2018/0297024 A1 | 10/2018 | Tran |
| 2019/0002950 A1 | 1/2019 | Pollak et al. |
| 2019/0087953 A1 | 3/2019 | Yorav-Raphael et al. |
| 2019/0110718 A1 | 4/2019 | Brittenham et al. |
| 2019/0130567 A1 | 5/2019 | Greenfield et al. |
| 2019/0145963 A1 | 5/2019 | Zait et al. |
| 2019/0266723 A1 | 8/2019 | Blanchard et al. |
| 2019/0302099 A1 | 10/2019 | Pollak et al. |
| 2019/0324255 A1 | 10/2019 | Pergande et al. |
| 2019/0347467 A1 | 11/2019 | Ohsaka et al. |
| 2020/0034967 A1 | 1/2020 | Yorav-Raphael et al. |
| 2020/0049970 A1 | 2/2020 | Eshel et al. |
| 2020/0111209 A1 | 4/2020 | Greenfield et al. |
| 2020/0209604 A1 | 7/2020 | Chen et al. |
| 2020/0249458 A1 | 8/2020 | Eshel et al. |
| 2020/0300750 A1 | 9/2020 | Eshel et al. |
| 2021/0069696 A1 | 3/2021 | Li et al. |
| 2022/0189016 A1 | 6/2022 | Barnes et al. |

FOREIGN PATENT DOCUMENTS

| | | |
|---|---|---|
| CN | 101501785 A | 8/2009 |
| CN | 101403650 B | 6/2010 |
| CN | 102282467 A | 12/2011 |
| CN | 104094118 A | 10/2014 |
| CN | 104471389 A | 3/2015 |
| CN | 105556276 A | 5/2016 |
| CN | 108474934 A | 8/2018 |
| EP | 0073551 | 3/1983 |
| EP | 0479231 | 4/1992 |
| EP | 0 744 191 A2 | 11/1996 |
| EP | 1381229 | 11/2003 |
| EP | 1 381 229 A1 | 1/2004 |
| EP | 1698883 | 9/2006 |
| EP | 2145684 A2 | 1/2010 |
| EP | 2 211 165 | 7/2010 |
| EP | 2 211 165 A2 | 7/2010 |
| EP | 3001174 | 3/2016 |
| EP | 3 123 927 A1 | 2/2017 |
| EP | 3482189 A1 | 5/2019 |
| EP | 1 873 232 B1 | 2/2020 |
| GB | 2329014 | 3/1999 |
| GB | 20120092477 A1 | 4/2012 |
| JP | 60-162955 A | 8/1985 |
| JP | 61-198204 A | 9/1986 |
| JP | 7-504038 A | 4/1995 |
| JP | 8-313340 A | 11/1996 |
| JP | 9-54083 A | 2/1997 |
| JP | 11-500832 A | 1/1999 |
| JP | H11-73903 A | 3/1999 |
| JP | 2000-199845 A | 7/2000 |
| JP | 2002-516982 A | 6/2002 |
| JP | 2003315684 A | 11/2003 |
| JP | 2004-144526 | 5/2004 |
| JP | 2004-257768 A | 9/2004 |
| JP | 2004-532410 A | 10/2004 |
| JP | 2005218379 A | 8/2005 |
| JP | 2006-506607 A | 2/2006 |
| JP | 2006294301 A | 10/2006 |
| JP | 2006-301270 A | 11/2006 |
| JP | 2007040814 | 2/2007 |
| JP | 2007093470 A | 4/2007 |
| JP | 20085768 A | 1/2008 |
| JP | 2008020498 A | 1/2008 |
| JP | 2009-180539 A | 8/2009 |
| JP | 2009-233927 A | 10/2009 |
| JP | 2009223164 A | 10/2009 |
| JP | 2009-268432 A | 11/2009 |
| JP | 2011-95225 A | 5/2011 |
| JP | 2013027368 A | 2/2013 |
| JP | 2013-515264 A | 5/2013 |
| JP | 2013517460 A | 5/2013 |
| JP | 2013-541767 A | 11/2013 |
| JP | 2014-41139 A | 3/2014 |
| JP | 2014-44050 A | 3/2014 |
| JP | 2015021938 A | 2/2015 |
| JP | 2015-57600 A | 3/2015 |
| JP | 2016-70658 A | 5/2016 |
| JP | 201671588 A | 5/2016 |
| JP | 2016-528506 A | 9/2016 |
| JP | 2016-189701 A | 11/2016 |
| JP | 2017-67524 A | 4/2017 |
| JP | 2017-209530 A | 11/2017 |
| JP | 2018-525611 A | 9/2018 |
| JP | 2018-534605 A | 11/2018 |
| JP | 2019-528459 A | 10/2019 |
| JP | 6952683 B2 | 10/2021 |
| RU | 2402006 C1 | 10/2010 |
| WO | 85/05446 A1 | 12/1985 |
| WO | 1985/005446 | 12/1985 |
| WO | 1996/001438 | 1/1996 |
| WO | 96/12981 A1 | 5/1996 |
| WO | 96/13615 A1 | 5/1996 |
| WO | 1996/013615 | 5/1996 |
| WO | 00/06765 A1 | 2/2000 |
| WO | 00/5557 A1 | 9/2000 |
| WO | 00/52195 A1 | 9/2000 |
| WO | 02/33400 A1 | 4/2002 |
| WO | 02/39059 A1 | 5/2002 |
| WO | 03/056327 | 7/2003 |
| WO | 2003/056327 | 7/2003 |
| WO | 03/065358 A2 | 8/2003 |
| WO | 03/073365 A1 | 9/2003 |
| WO | 03/081525 A1 | 10/2003 |
| WO | 2004/020112 A1 | 3/2004 |
| WO | 2004/111610 A2 | 12/2004 |
| WO | 2005/121863 A1 | 12/2005 |
| WO | 2006/121266 A1 | 11/2006 |
| WO | 2017/046800 | 10/2007 |
| WO | 2008/063135 A1 | 5/2008 |
| WO | 2009136570 A1 | 11/2009 |
| WO | 2010/036827 A1 | 4/2010 |
| WO | 2010/056740 | 5/2010 |
| WO | 2010/116341 A1 | 10/2010 |
| WO | 2010/126903 A1 | 11/2010 |
| WO | 2010/137543 A1 | 12/2010 |
| WO | 2011/056658 A1 | 5/2011 |
| WO | 2011/076413 A1 | 6/2011 |
| WO | 2011/123070 A1 | 10/2011 |
| WO | 2012/029269 A1 | 3/2012 |
| WO | 2012107468 A1 | 8/2012 |
| WO | 2012/154333 A1 | 11/2012 |
| WO | 2013/041951 A1 | 3/2013 |
| WO | 2013/098821 A1 | 7/2013 |
| WO | 2013/102076 A1 | 7/2013 |
| WO | 2014/146063 A2 | 9/2014 |
| WO | 2014/159620 | 10/2014 |

(56) References Cited

FOREIGN PATENT DOCUMENTS

| | | |
|---|---|---|
| WO | 2015/029032 | 3/2015 |
| WO | 2015/089632 A1 | 6/2015 |
| WO | 2016/021311 A1 | 2/2016 |
| WO | 2016/030897 A1 | 3/2016 |
| WO | 2017/046802 | 11/2016 |
| WO | 2016/203320 A2 | 12/2016 |
| WO | 2017/046799 | 3/2017 |
| WO | 2017/168411 A1 | 10/2017 |
| WO | 2017/046801 | 11/2017 |
| WO | 2017/195205 A1 | 11/2017 |
| WO | 2017/195208 A1 | 11/2017 |
| WO | 2018/009920 A1 | 1/2018 |
| WO | 2018/102748 A1 | 6/2018 |
| WO | 2019/035084 A1 | 2/2019 |
| WO | 2017/046803 | 5/2019 |
| WO | 2019/097387 A1 | 5/2019 |
| WO | 2019/102277 A1 | 5/2019 |
| WO | 2019/198094 A1 | 10/2019 |
| WO | 2021/079305 A1 | 4/2021 |
| WO | 2021/079306 A1 | 4/2021 |
| WO | 2021/116962 A1 | 6/2021 |
| WO | 2022/009104 A2 | 1/2022 |

OTHER PUBLICATIONS

Rappaz, Benjamin, et al. "Comparative study of human erythrocytes by digital holographic microscopy, confocal microscopy, and impedance volume analyzer." Cytometry Part A 73.10 (2008): 895-903.
An International Search Report and a Written Opinion both dated Jan. 15, 2016, for International Application No. PCT/IL2015/050864. (SDX028-CAT-2).
An International Search Report and a Written Opinion both dated Feb. 12, 2015, for International Application No. PCT/IL2014/050770. (SDX023-CAT-2).
An International Search Report and a Written Opinion both dated Apr. 18, 2013, for International Application No. PCT/IL2012/050556 (SDX006-CAT-1).
An International Search Report and a Written Opinion dated Jul. 27, 2012 for International Application No. PCT/IL2011/000973. (SDX002-CAT-1).
A Final Office Action dated Jul. 29, 2019 which issued during the prosecution of U.S. Appl. No. 14/914,329 (SDX024-CAT-2).
A European Search Report dated Mar. 23, 2017. which issued during the prosecution of Applicant's European App No. 14839661.7.((SDX052-CAT-2)).
An Office Action dated Aug. 24, 2020 for U.S. Appl. No. 16/098,893 (SDX063-CAT-3).
An Office Action dated Jun. 23, 2020 for U.S. Appl. No. 16/706,159 (SDX071-CAT-2).
U.S. Appl. No. 62/042,388, filed Aug. 27, 2014 (CAT-2).
U.S. Appl. No. 61/870,106 filed Aug. 26, 2013. (CAT-2).
An Office Action in Indian Application 3592/MUMNO/2015 mailed Dec. 24, 2018. 4 pages. (SDX021-CAT-1).
An Office Action dated Sep. 25, 2015, which issued during the prosecution of U.S. Appl. No. 13/338,291 (SDX003-CAT-1).
An Office Action dated Oct. 29, 2014, which issued during the prosecution of U.S. Appl. No. 13/338,291 (SDX003-CAT-1).
An Office Action dated Nov. 16, 2018 which issued during the prosecution of U.S. Appl. No. 14/914,329. (SDX024-CAT-2).
An Office Action dated Mar. 23, 2018 which issued during the prosecution of Indian Patent Application No. 4263/DELNP/2014 (SDX011-CAT-1).
An International Search Report and a Written Opinion both dated Oct. 30, 2014, for International Application No. PCT/IL2014/050585. (SDX017-CAT-1).
An International Search Report and Written Opinion in International Application No. PCT/IB2018/058861, issued on Apr. 8, 2019 (SDX066-CAT-?).
An International Search Report and Written Opinion, dated Aug. 30, 2017 from the International Bureau in counterpart International application No. PCT/IL2017/050526 (SDX037-CAT-3).
An International Search Report and Written Opinion, dated Aug. 8, 2017 from the International Bureau in counterpart International application No. PCT/IL2017/050523 (SDX036-CAT-3).
An International Search Report and Written Opinion, dated May 18, 2017 from the International Bureau in counterpart International application No. PCT/IL2017/050363 (SDX035-CAT-3).
An Office Action dated Apr. 2, 2015, which issued during the prosecution of U.S. Appl. No. 13/338,291 (SDX003-CAT-1).
An Office Action dated Apr. 4, 2019 which issued during the prosecution of U.S. Appl. No. 14/914,329. (SDX024-CAT-2).
An Office Action dated Dec. 24, 2018 which issued during the prosecution of Indian Patent Application No. 3592/2012 (SDX021-CAT-1).
An Office Action dated Feb. 22, 2018 which issued during the prosecution of U.S. Appl. No. 14/369,251 (SDX007-CAT-1).
An Office Action dated Jan. 10, 2018. which issued during the prosecution of U.S. Appl. No. 15/083,610. (SDX022-CAT-1).
An Office Action dated Jan. 28, 2019 which issued during the prosecution of U.S. Appl. No. 15/174,490. (SDX004-CAT-1).
An Office Action dated Jul. 11, 2017. which issued during the prosecution of U.S. Appl. No. 15/174,672. (SDX004-CAT-1).
An Office Action dated Jun. 13, 2017. which issued during the prosecution of U.S. Appl. No. 14/285,672 (SDX015-CAT-2).
An Office Action dated Jun. 15, 2018 from the United States Patent and Trademark Office in copending U.S. Appl. No. 14/369,251 (SDX007-CAT-1).
An Office Action dated Jun. 29, 2018 from the United States Patent and Trademark Office in copending U.S. Appl. No. 15/174,490. (SDX004-CAT-1).
An Office Action dated Jun. 4, 2019, which issued during the prosecution of U.S. Appl. No. 14/369,251 (SDX007-CAT-1).
An Office Action dated Jun. 5, 2019, which issued during the prosecution of U.S. Appl. No. 15/174,490 (SDX004-CAT-1).
An International Search Report and Written Opinion, dated August 8, 2017 from the International Bureau in counterpart International application No. PCT/IL2017/050523 (SDX036-CAT-3).
An Office Action dated Aug. 24, 2020 which issued during the prosecution of U.S. Appl. No. 16/098,893 (SDX063-CAT-3).
A European Examination Report dated Dec. 9, 2019. which issued during the prosecution of Applicant's European App No. 16782094.3.
Notice of Allowance dated Mar. 2, 2020, which issued during the prosecution of U.S. Appl. No. 16/657,473.
A European Examination Report dated Feb. 1, 2019. which issued during the prosecution of Applicant's European App No. 17717000.8.
A European Examination Report dated Sep. 3, 2019. which issued during the prosecution of Applicant's European App No. 17717000.8.
A European Examination Report dated Apr. 8, 2020. which issued during the prosecution of Applicant's European App No. 17717000.8.
A European Examination Report dated Apr. 6, 2020. which issued during the prosecution of Applicant's European App No. 17726036.1.
A European Examination Report dated Feb. 11, 2020. which issued during the prosecution of Applicant's European App No. 17728277.9.
An Advisory Action dated Dec. 27, 2019 for U.S. Appl. No. 14/914,329.
Panel Decision dated Mar. 2, 2020 for U.S. Appl. No. 14/914,329.
An Examination Report for Indian Application No. 201727008982 on Jan. 29, 2021.
An Office Action dated Jan. 19, 2021 for U.S. Appl. No. 16/706,159.
Saraswat, et al. "Automated microscopic image analysis for leukocytes identification: A survey", ABV-Indian Institute of Information Technology and Management, Gwalior, India, Micron, 2014, vol. 65, pp. 20-33.
Hiremath, P.S,. et al., "Automated Identification and Classification of White Blood Cells (Leukocytes) in Digital Microscopic Images",

(56) References Cited

OTHER PUBLICATIONS

IJCA Special Issue on "Recent Trends in Image Processing and Pattern Recognition" RTIPPR, 2010, pp. 59-63.
Witt, et al. "Establishing traceability of photometric absorbance values for accurate measurements of the haemoglobin concentration in blood.", Metrologia 50 (2013) 539-548.
Putzu, et al., "Leucocyte classification for leukaemia detection using image processing techniques.", Artificial Intelligence in Medicine, vol. 63, No. 3, Nov. 1, 2014, pp. 1-31.
Varga, et al., "An automated scoring procedure for the micronucleus test by image analysis", Mutagenesis vol. 19 No. 5 pp. 391-397, 2004.
Ran, Qiong et al. "Spatial-spectral blood cell classification with microscopic hyperspectral imagery", Proc. SPIE 10461, AOPC 2017: Optical Spectroscopy and Imaging, 1046102 (Oct. 24, 2017) (12 pages total).
Omucheni et al. "Application of principal component analysis to multispectral-multimodal optical image analysis for malaria diagnostics", Malaria Journal 2014, 13:485 485 http://www.malariajournal.com/content/13/1/485 (11 pages total).
Ben-Suliman—2018—"Computerized Counting-Based System for Acute Lymphoblastic Leukemia Detection in Microscopic Blood Images" 27th International Conference on Artificial Neural Networks, Rhodes, Greece, Oct. 4-7, 2018, Proceedings, Part II, pp. 167-178.
An Office Action dated Dec. 8, 2020 for Japanese Patent Application No. 2018/512961.
An Examination Report issued on Dec. 7, 2020 for Australian Patent Application No. 2016322966.
An Office Action dated Jan. 11, 2021 for U.S. Appl. No. 16/098,893.
An Examination Report issued on Apr. 29, 2021 for Australian Patent Application No. 2016322966.
A Notice of Allowance issued on May 13, 2021 for U.S. Appl. No. 16/592,335.
A Notice of Allowance issued on Jan. 27, 2021 for U.S. Appl. No. 16/592,335.
International Search Report issued for PCT Application No. PCT/IB2020/059924 on Mar. 22, 2021.
International Search Report issued for PCT Application No. PCT/IB2020/059925 on Mar. 26, 2021.
Invitation to pay fees and Partial Search Report issued for PCT Application No. PCT/IB2020/059924 on Jan. 28, 2021.
Invitation to pay fees and Partial Search Report issued for PCT Application No. PCT/IB2020/059925 on Feb. 4, 2021.
A Notice of Allowance issued on May 14, 2021 for U.S. Appl. No. 16/232,124.
A Japanese Office Action dated Mar. 30, 2021, which issued during the prosecution of Application No. 2018/558180.
An Office Action dated Mar. 9, 2021 for U.S. Appl. No. 16/088,321.
An Office Action dated Jan. 29, 2021 for U.S. Appl. No. 16/099,270.
An Extended European Search Report issued for European Patent Application No. 21164814.2 on Jun. 9, 2021.
Third Office Action dated Jul. 12, 2021 which issued during the prosecution of Chinese Patent Application No. 201680053431.1.
Non-Final Office Action dated Jul. 27, 2021, which issued during the prosecution of U.S. Appl. No. 16/851,686.
Non-Final Office Action dated Aug. 19, 2021, which issued during the prosecution of U.S. Appl. No. 16/098,893.
Non-Final Office Action dated Sep. 1, 2021 which issued during the prosecution of U.S. Appl. No. 16/088,321.
First Office Action dated Aug. 4, 2021 which issued during the prosecution of Chinese Patent Application No. 201780027908.3.
An Examination Report dated Mar. 4, 2021 which issued during the prosecution of Indian Patent Application No. 201817036130.
An Examination Report dated May 5, 2021 which issued during the prosecution of Indian Patent Application No. 201817012117.
Notice of Allowance dated Aug. 3, 2021, which issued during the prosecution of U.S. Appl. No. 16/851,410.
An International Search Report and Written Opinion for Application No. PCT/IB2020/061731 issued on Feb. 10, 2021.
Invitation to pay fees and Partial Search Report issued for PCT Application No. PCT/IB2020/061732 on Mar. 10, 2021.
Invitation to pay fees and Partial Search Report issued for PCT Application No. PCT/IB2020/061736 on Mar. 12, 2021.
Invitation to pay fees and Partial Search Report issued for PCT Application No. PCT/IB2020/061728 on Mar. 15, 2021.
International Search Report issued for PCT Application No. PCT/IB2020/061724 on Mar. 10, 2021.
An International Search Report and Written Opinion for PCT Application No. PCT/IB2020/061732 mailed on May 7, 2021.
International Search Report and Written Opinion for PCT Application No. PCT/IB2020/061728 mailed on May 7, 2021.
International Search Report and Written Opinion for PCT Application No. PCT/IB2020/061736 mailed on May 3, 2021.
Non-Final Office Action dated Jun. 17, 2021 which issued during the prosecution of U.S. Appl. No. 16/851,410.
A Final Office Action dated Jun. 17, 2021 which issued during the prosecution of U.S. Appl. No. 16/088,321.
Notice of Allowance dated May 19, 2021 which issued during the prosecution of U.S. Appl. No. 16/099,270.
A Restriction Requirement issued by the USPTO on Oct. 19, 2020 for U.S. Appl. No. 16/099,270.
Non-Final Office Action dated Jun. 25, 2021 which issued during the prosecution of U.S. Appl. No. 16/706,159.
Notice of Allowance dated Jun. 24, 2021 which issued during the prosecution of U.S. Appl. No. 16/232,124.
An Extended European Search Report issued for European Patent Application No. 21154596.7 on Jul. 23, 2021.
Notice of Allowance dated Nov. 5, 2021, which issued during the prosecution of U.S. Appl. No. 16/851,410.
Notice of Allowance dated Nov. 10, 2021, which issued during the prosecution of U.S. Appl. No. 16/851,686.
Supplemental Notice of Allowance dated Nov. 12, 2021, which issued during the prosecution of U.S. Appl. No. 16/851,686.
A European Examination Report issued for European Patent Application No. 17728277.9 on Dec. 23, 2021.
Notice of Allowance dated Jan. 21, 2022, which issued during the prosecution of U.S. Appl. No. 16/098,893.
An Office Action dated Feb. 16, 2022 which issued during the prosecution of U.S. Appl. No. 16/088,321.
An Office Action dated May 6, 2022 which issued during the prosecution of U.S. Appl. No. 16/763,810.
A Non-Final Office Action dated May 26, 2022 which issued during the prosecution of U.S. Appl. No. 17/083,775.
An Office Action dated May 31, 2022 which issued during the prosecution of U.S. Appl. No. 17/083,659.
An Extended European Search Report issued for European Patent Application No. 21194040.8 on Jan. 18, 2022.
An International Search Report and a Written Opinion dated Sep. 17, 2021, for International Application No. PCT/IB2021/056073.
Hoover Karl "SimpleAutofocus.cpp—Micro-Manager Device Adapter Code", Dec. 31, 2009.
MetaXpress® 6 Software Guide, Configuring Image-Based Autofocus During Acquisition—2015.
Micro-Manager-User's-Guide-Micro-Manager—2016.
MicroManager Documentation: SimpleAutofocus—2009.
A European Examination Report dated Dec. 10, 2021 which issued during the prosecution of Applicant's European App No. 15778059.4.
Examination Report issued by the Indian Patent Office on Jun. 28, 2022 in Indian Patent Application No. 202047019700.
Communication dated Mar. 2, 2023 issued by the Canadian Patent Office in application No. 3,018,536.
Communication dated Jun. 8, 2023 issued by the Canadian Patent Office in application No. 3,160,692.
Communication dated Jun. 9, 2023 issued by the Canadian Patent Office in application No. 3,160,688.
Communication dated Jun. 22, 2023 issued by the Canadian Patent Office in application No. 3,160,697.
Communication dated Jul. 12, 2023 issued by the Canadian Patent Office in application No. 3,155,820.
Communication dated Jul. 17, 2023 issued by the Canadian Patent Office in application No. 3,155,821.

(56) References Cited

OTHER PUBLICATIONS

Communication dated Nov. 10, 2022 issued by the United States Patent and Trademark Office in U.S. Appl. No. 17/362,009.
Notice of Allowance dated Mar. 21, 2023 issued by the United States Patent and Trademark Office in U.S. Appl. No. 17/362,009.
Notice of Allowance dated Jun. 22, 2023 issued by the United States Patent and Trademark Office in U.S. Appl. No. 17/576,023.
Communication dated Jul. 3, 2023 issued by the United States Patent and Trademark Office in U.S. Appl. No. 17/568,858.
An Office Action dated Nov. 25, 2022 which issued during the prosecution of U.S. Appl. No. 17/082,483.
An Office Action dated Jul. 12, 2022, which issued during the prosecution of U.S. Appl. No. 16/088,321.
An Office Action dated Aug. 2, 2022, which issued during the prosecution of Japanese Patent Application No. 2021-145455.
An Examination Report dated Aug. 25, 2022, which issued during the prosecution of Australian Patent Application No. 2017263807.
An Office Action dated Aug. 30, 2022 which issued during the prosecution of Japanese Patent Application No. 2020-526176.
An Office Action dated Sep. 13, 2022 which issued during the prosecution of Japanese Patent Application No. 2021-157849.
Hideto Miura, "How to regard as how to consider the poikilocyte in urine an erroneous decision factor", Modern Medical Laboratory, Sep. 1, 2002, vol. 30, No. 9, pp. 862-864 (6 pages total).
Jun Hashimoto, "Morphological Studies of Urinary Red Blood Cells in Renal and Urinary Tract Disorders (II) Use of Wrights Stain in Differential Diagnosis between Renal and Urinary Tract Disorders" Kawasaki Medical Congress Magazine, Mar. 1989, vol. 15, No. 1, pp. 94-101 (9 pages total).
D F Birch et al., "The research on the differential diagnosis of the kidney urinary tract obstacle by glomerular or non-glomerular", The Lancet, Oct. 20, 1979, vol. 2, No. 8147, pp. 845-846 (3 pages total).
A First Examination Report dated Sep. 19, 2022, which issued during the prosecution of Indian Patent Application No. 201817040226.
An Office Action dated Oct. 3, 2022 which issued during the prosecution of U.S. Appl. No. 16/763,810.
An Office Action dated Oct. 25, 2022 which issued during the prosecution of Canadian Application No. 2,998,829.
An Office Action dated Oct. 5, 2022 which issued during the prosecution of Brazilian Application No. 112018005099-7.
An Office Action dated Nov. 25, 2022 which issued during the prosecution of Brazilian Application No. 122020017765-9.
An Office Action dated Dec. 9, 2022 which issued during the prosecution of U.S. Appl. No. 17/083,647.
An Office Action dated Dec. 28, 2022 which issued during the prosecution of Russian Patent Application No. 2022112399.
An Office Action dated Dec. 28, 2022 which issued during the prosecution of Russian Patent Application No. 2022112393.
An Office Action dated Jan. 5, 2023 which issued during the prosecution of Chinese Patent Application No. 201880079888.9.
An Office Action dated Jan. 19, 2023 which issued during the prosecution of U.S. Appl. No. 17/490,767.
An Examination Report dated Jan. 23, 2023, which issued during the prosecution of Australian Patent Application No. 2022200112.
An Office Action dated Feb. 17, 2023 which issued during the prosecution of U.S. Appl. No. 17/576,023.
An Office Action dated Feb. 22, 2023 which issued during the prosecution of Canadian Application No. 3,081,669.
An Office Action dated Mar. 3, 2023 which issued during the prosecution of U.S. Appl. No. 17/082,483.
An Office Action dated Mar. 7, 2023 which issued during the prosecution of Japanese Application No. JP 2021-157849.
Taihei Takakusaki, "Shape Change of Red Cell Ghost and ATP", The Kitakanto Medical Journal, 1960, vol. 10, Issue 4, pp. 522-531 (11 pages total).
Olga V. Tyulina et al., "Erythrocyte and plasma protein modification in alcoholism: A possible role of acetaldehyde", Biochimica et Biophyisca, 2006, vol. 1762, pp. 558-563 (7 pages total).
Masafumi Onodera, "Organ Derangement", Medicina, Sep. 9, 2005, vol. 42, No. 9, pp. 1582-1584 (6 pages total).
Tetsuya Hirota et al., Kusanon A® Poisoning Complicated by Heinz Body Hemolytic Anemia, Japanese Association for Acute Medicine Magazine, vol. 12, No. 12, Dec. 15, 2001, pp. 749-754 (1 page total).
A. K. Sawhney et al., Erythrocyte Alterations Induced by Malathion in *Channa punctatus* (Bloch), Bull. Environ. Contam. Toxicol, 2000, vol. 64, pp. 398-405 (9 pages total).
An Office Action dated Mar. 17, 2023 which issued during the prosecution of U.S. Appl. No. 17/083,647.
An Extended European Search Report which issued on Mar. 20, 2023 for Application No. 22209948.3.
An Office Action dated Mar. 27, 2023 which issued during the prosecution of U.S. Appl. No. 16/763,810.
An Office Action dated Mar. 27, 2023 which issued during the prosecution of Brazilian Application No. 122020017765-9.
Notice of Allowance issued for U.S. Appl. No. 16/088,321 on Apr. 12, 2023.
Second Notice of Allowance dated Aug. 23, 2023 which issued during the prosecution of U.S. Appl. No. 17/490,767.
Notice of Allowance dated May 15, 2023 which issued during the prosecution of U.S. Appl. No. 17/490,767.
An Examination Report dated Aug. 16, 2023, which issued during the prosecution of Australian Patent Application No. 2018369859.
An Office Action dated Aug. 25, 2023 which issued during the prosecution of Canadian Application No. 3,160,702.
An Office Action dated May 30, 2023 which issued during the prosecution of U.S. Appl. No. 17/082,615.
A Hearing Notice issued by the Indian Patent Office on Aug. 29, 2023 for IN 201817012117.
A Hearing Notice issued by the Indian Patent Office on Sep. 1, 2023 for IN 201817036130.
An Office Action dated Sep. 14, 2023 which issued during the prosecution of U.S. Appl. No. 17/083,647.
Office Action dated Dec. 7, 2023 which issued during the prosecution of Canadian Application No. 3,081,669.
Notice of Allowance dated Jun. 22, 2023 which issued during the prosecution of U.S. Appl. No. 17/576,023.
A Summons to an Oral Hearing issued by the European Patent Office on Oct. 5, 2023 for Application No. 17728277.9.
A Decision to Refuse issued on Oct. 3, 2023 for Japanese Patent Application No. 2021-157849.
An Office Action dated Oct. 13, 2023 which issued during the prosecution of Canadian Application No. 2,998,829.
Notice of Allowance dated Oct. 12, 2023 which issued during the prosecution of U.S. Appl. No. 17/568,858.
An Office Action dated Oct. 17, 2023 which issued during the prosecution of U.S. Appl. No. 17/082,615.
A Hearing Notice issued by the Indian Patent Office on Nov. 9, 2023 for IN 201817040226.
An Office Action dated Dec. 19, 2023 which issued during the prosecution of Canadian Application No. 3,018,536.
An Office Action dated Dec. 21, 2023 which issued during the prosecution of Brazilian Application No. 112018072627-3.
An Office Action dated Jan. 9, 2024 which issued during the prosecution of U.S. Appl. No. 18/203,109.
Notice of Allowance issued for U.S. Appl. No. 16/763,810 on Feb. 8, 2024.
A Final Office Action dated Feb. 29, 2024 which issued during the prosecution of United States U.S. Appl. No. 17/083,647.
An Office Action dated Mar. 4, 2024 which issued during the prosecution of Canadian Application No. 3,022,770.
An Office Action dated Jan. 12, 2023 which issued during the prosecution of Canadian Application No. 3,022,770.
International Search Report and Written Opinion for PCT Application No. PCT/IB2023/062469 mailed on Mar. 11, 2024.
An Office Action dated Mar. 6, 2024 which issued during the prosecution of Canadian Application No. 3,160,688.
An Office Action dated Mar. 11, 2024 which issued during the prosecution of Canadian Application No. 3,160,692.
An Office Action dated Mar. 22, 2024 which issued during the prosecution of U.S. Appl. No. 17/360,503.
An Office Action dated Apr. 3, 2024 which issued during the prosecution of Canadian Application No. 3,160,697.

(56) References Cited

OTHER PUBLICATIONS

An Office Action dated Apr. 19, 2024 which issued during the prosecution of Canadian Application No. 3,155,820.
Examination Report dated Apr. 23, 2024 which issued during the prosecution of New Zealand Application No. 787743.
Examination Report dated Apr. 24, 2024 which issued during the prosecution of New Zealand Application No. 787745.
A European Examination Report dated Apr. 29, 2024 which issued during the prosecution of Application No. 20 800 326.9.
A European Examination Report dated May 6, 2024 which issued during the prosecution of Application No. 20 800 325.1.
A Restriction Requirement dated May 7, 2024 which issued during the prosecution of U.S. Appl. No. 17/770,339.
A European Examination Report dated May 8, 2024 which issued during the prosecution of Application No. 20 828 314.3.
Kerem Delikoyun, et al., "2 Deep learning-based cellular image analysis for intelligent medical diagnosis", De Gruyter, 2021 (4 pages) https://www.degruyter.com/document/doi/10.1515/9783110668322-002/html.
C.Briggs, et al., "ICSH guidelines for the evaluation of blood cell analysers including those used for differential leucocyte and reticulocyte counting", International Journal of Laboratory Hematology, 2014, vol. 36, pp. 613-627 (15 pages).
Office Action dated Feb. 1, 2024 which issued during the prosecution of U.S. Appl. No. 18/214,568.
Notice of Allowance issued for Canadian Application No. 3, 155,821 on May 21, 2024.
An Office Action dated May 29, 2024 which issued during the prosecution of Korean Application No. 10-2022-7017082.
An Office Action dated May 29, 2024 which issued during the prosecution of Korean Application No. 10-2022-7017081.
Notice of Allowance dated May 31, 2024 which issued during the prosecution of U.S. Appl. No. 18/214,568.
A Chinese Office Action dated May 9, 2024 which issued during the prosecution of Application No. 202080085933.9.
Groen F C A et al: :A Comparison of Different Focus Functions for Use in Autofocus Algorithms, Cytometry, Alan Liss, New York, US, vol. 6, No. 2, Mar. 1, 1985 (Mar. 1, 1985), pp. 81-91.
Agero, U., Mesquita, L.G., Neves, B.R.A., Gazzinelli, R.T. and Mesquita, O.N., 2004. Defocusing microscopy. Microscopy research and technique, 65(3), pp. 159-165.
An International Search Report and a Written Opinion both dated Jan. 23, 2017, which issued during the prosecution of Applicant's PCT/IL2016/051025.
An Office Action dated Oct. 5, 2016, which issued during the prosecution of U.S. Appl. No. 14/285,672.
Andrew Gordon et al: "Supplementary Note to Gordon et al.: "Single-cell quantification of molecules . . . "", Nature Methods, Jan. 21, 2007, pp. 1-35.
Bacus, J.W., 1985. Cytometric approaches to red blood cells. Pure and Applied Chemistry, 57(4), pp. 593-598.
An International Preliminary Report on Patentability dated Feb. 28, 2017, which issued during the prosecution of Applicant's PCT/IL2015/050864.
Emma Eriksson et al: "Automated focusing of nuclei for time lapse experiments on single cells using holographic optical tweezers", Optics Express vol. 17, No. 7, Mar. 24, 2009 pp. 5585-5594.
European Search Report dated Dec. 14, 2016, which issued during the prosecution of Applicant's European App No. 14800352.8.
Bravo-Zanoguera, M.E., Laris, C.A., Nguyen, L.K., Oliva, M. and Price, J.H., 2007. Dynamic autofocus for continuous-scanning time-delay-and-integration image acquisition in automated microscopy. Journal of biomedical optics, 12(3), pp. 034011-034011.
An Office Action dated Mar. 2, 2017, which issued during the prosecution of U.S. Appl. No. 14/369,251.
Notice of Allowance dated Mar. 20, 2019, which issued during the prosecution of U.S. Appl. No. 15/506,997.
A European Examination Report dated Dec. 11, 2019 which issued during the prosecution of Applicants European App No. 14800352. 8.

An Office Action dated Mar. 26, 2018, which issued during the prosecution of U.S. Appl. No. 14/285,672.
F. Boray Tek et al. "Parasite detection and identification for automated thin blood film malaria diagnosis", Computer Vision and Image Understanding vol. 114, Issue 1, Jan. 2010, pp. 21-32 (total 12 pages).
Life Technologies Corporation, "Counting blood cells with Countless Automated Cell Counter" found at http://www.lifetechnologies.com/content/dam/LifeTech/migration/files/cell-tissue-analysis/pdfs.par.83996.file.dat/w-082149-countless-application-blood-cells.pdf, four pages, (2009) (total 4 pages).
UNITAID Malaria Diagnostic Technology And Market Landscape, 2nd Edition (2014) (total 148 pages).
A Chinese Office Action dated Dec. 19, 2019 for Chinese Application No. 201580058510.7.
An International Search Report and a Written Opinion both dated Mar. 25, 2013, for International Application No. PCT/IL2012/050423.
Cervantes, Serena , Jacques Prudhomme, David Carter, Krishna G Gopi, Qian Li, Young-Tae Chang, and Karine G Le Roch, High-content live cell imaging with RNA probes: advancements in high-throughput antimalarial drug discovery, BMC Cell Biology 2009, 10:45, <https://bmcmolcellbiol.biomedcentral.com/track/pdf/10.1186/1471-2121-10-45> (Jun. 10, 2009) (total 10 pages).
Leif, "Methods for Preparing Sorted Cells as Monolayer Specimens", Springer Lab Manuals, Section 7—Chapter 5 pp. 592-619, (2000), (total 28 pages).
U.S. Appl. No. 62/042,388, filed Aug. 27, 2014.
Zahniser et al., Automated Slide Preparation System for the Clinical Laboratory, Cytometry, vol. 26, No. 10, pp. 60-64, (1996) (total 5 pages).
Andrew Gordon et al: "Single-cell quantification of molecules and rates using open-source microscope-based cytometry", HHS Public Access Author Manuscript, vol. 4, No. 2, Jan. 21, 2007, pp. 175-181.
Yazdanfar, S., Kenny, K.B., Tasimi, K., Corwin, A.D., Dixon, E.L. and Filkins, R.J., 2008. Simple and robust image-based autofocusing for digital microscopy. Optics express, 16(12), pp. 8670-8677.
Roma, P. M. S., et al. "Total three-dimensional imaging of phase objects using defocusing microscopy: Application to red blood cells." Applied Physics Letters 104.25 (2014): 251107.
European Search Report dated Mar. 23, 2017, which issued during the prosecution of Applicant's European App No. 14839661.7.
Steven S.S. Poon, et al., "Automated Image Detection and Segmentation in Blood Smears", Cytometry, 1992, pp. 766-774, vol. 13 (9 pages total).
Caicai Wu, et al., "Feasibility study of the spectroscopic measurement of oxyhemoglobin using whole blood without pre-treatment", The Analyst, Mar. 1998, pp. 477-481, vol. 123 (5 pages total).
Office Action dated Jun. 5, 2019, which issued during the prosecution of U.S. Appl. No. 15/174,490.
Houri-Yafin, A., et al. "An enhanced computer vision platform for clinical diagnosis of malaria." Malar Control Elimin 5.138.10 (2016): 4172.
An Office Action dated Jul. 11, 2017, which issued during the prosecution of U.S. Appl. No. 15/174,672.
A European Examination Report dated Jan. 7, 2020 which issued during the prosecution of Applicants European App No. 15778059. 4.
An Office Action dated Mar. 9, 2020 , which issued during the prosecution of U.S. Appl. No. 16/232,124.
Guy, Rebecca, Paul Liu, Peter Pennefather and Ian Crandall, "The use of fluorescence enhancement to improve the microscopic diagnosis of falciparum malaria", Malaria Journal 2007 6:89, https://malariajournal.biomedcentral.com/articles/10.1186/1475-2875-6-89, (Jul. 9, 2007) (total 8 pages).
Moody , "Rapid Diagnostic Tests for Malaria Parasites", Clinical Microbiology Reviews, vol. 15, No. 1, pp. 66-78, 12 (2002) (total 13 pages).
Xu, Lili, Asok Chaudhuri, "Plasmodium yoelii: A differential fluorescent technique using Acridine Orange to identify infected erythrocytes and reticulocytes in Duffy knockout mouse", Experimental

(56) References Cited

OTHER PUBLICATIONS

Parasitology, vol. 110, Issue 1, May 2005, pp. 80-87, <https://www.sciencedirect.com/science/article/pii/S001448940500038X>, (May 31, 2005) (total 8 pages).
Office Action issued Aug. 27, 2020 in U.S. Appl. No. 16/098,893.
Restriction Requirement issued Aug. 24, 2020 in U.S. Appl. No. 16/088,321.
Office Action issued May 22, 2020 in Chinese Patent Application No. 201680053431.1.
Anne Fohlen-Walter, PhD, et al., "Laboratory Identification of Cryoglobulinemia From Automated Blood Cell Counts, Fresh Blood Samples, and Blood Films", American Society for Clinical Pathology, Am J Clin Pathol, 2002, pp. 606-614, vol. 117 (9 pages total).
Ross, Nicholas E., et al. "Automated image processing method for the diagnosis and classification of malaria on thin blood smears." Medical and Biological Engineering and Computing 44.5 (2006): 427-436.
An Office Action dated Jun. 13, 2017, which issued during the prosecution of U.S. Appl. No. 14/285,672.
Communication dated Jan. 28, 2019, from United States Patent and Trademark Office in counterpart U.S. Appl. No. 15/174,490.
Communication dated Dec. 24, 2018, from Intellectual Property India in counterpart application No. 3592/MUMNP/2015.
Sheikh, et al., "Blood Cell Identification Using Neural Networks", IEEE, 1996 (p. 119-120).
Le, et al., "A novel semi-automatic image processing approach to determine Plasmodium falciparum parasitemia in Giemsa-stained thin blood smears", BMC Cell Biology, Mar. 28, 2008 (pp. 1-12).
John F. Brenner, et al., "An Automated Microscope for Cytologic Research a Preliminary Evaluation", The Journal of Histochemistry and Cytochemistry, 1976, pp. 100-111, vol. 24, No. 1 (12 pages total).
International Search Report in International Application No. PCT/IB2018/058861, issued on Apr. 8, 2019.
Office Action dated Jun. 4, 2019, which issued during the prosecution of U.S. Appl. No. 14/369,251.
Matcher, S. J., M. Cope, and D. T. Delpy. "Use of the water absorption spectrum to quantify tissue chromophore concentration changes in near-infrared spectroscopy." Physics in medicine and biology 39.1 (1994): 177.
Ahirwar, Neetu, Sapnojit Pattnaik, and Bibhudendra Acharya. "Advanced image analysis based system for automatic detection and classification of malarial parasite in blood images." International Journal of Information Technology and Knowledge Management 5.1 (2012): 59-64.
Communication dated Dec. 21, 2018, from United States Patent and Trademark Office in counterpart U.S. Appl. No. 14/369,251.
Communication dated Jan. 31, 2019, from Intellectual Property India in counterpart application No. 5069/DELNP/2012.
"Blood specimens: Microscopic Examination", Centers for Disease Control and Prevention CDC, Diagnostic Procedures, 2009, <http://www.dpd.cdc.gov/dpdx/HTML/Frames/DiagnosticProcedures/body_dp_bloodexamin.htm> (total 2 pages).
An Indian Examination Report dated Apr. 22, 2020. which issued during the prosecution of Indian App No. 201617009399.
Briggs, C., et al., "Continuing developments with the automated platelet count", Blackwell Publishing Ltd, International Journal of Laboratory Hematology, Jan. 18, 2007, pp. 77-91, vol. 29 (15 pages total).
Knesel, "Roche Image Analysis Systems, Inc.", Acta Cytologica, vol. 40, pp. 60-66, (1996). (total 7 pages).
Moon S, Lee S, Kim H, Freitas-Junior LH, Kang M, Ayong L, et al. (2013), An Image Analysis Algorithm for Malaria Parasite Stage Classification and Viability Quantification, PLoS One 8(4): e61812. <https://doi.org/10.1371/journal.pone.0061812> (total 12 pages).
Yao, LN et al. "Pathogen identification and clinical diagnosis for one case infected with Babesia", Zhongguo ji sheng chong xue yu ji sheng chong bing za zhi Chinese journal of parasitology parasitic diseases, Aug. 2012 (total 4 pages).
S A H Jahanmehr, et al., "Simple Technique for Fluorescence Staining of Blood Cells with Acridine Orange", Journal of Clinical Pathology, Feb. 12, 1987, pp. 926-929 (4 pages total).
Written Opinion in International Application No. PCT/IB2018/058861, issued on Apr. 8, 2019.
Rappaz, Benjamin, et al. "Comparative study of human erythrocytes by digital holographic microscopy, confocal microscopy, and impedance vol. analyzer." Cytometry Part A 73.10 (2008): 895-903.
An Office Action dated Aug. 4, 2017, which issued during the prosecution of U.S. Appl. No. 14/369,251.
Wissing, et al., "Illumination of the Malaria Parasite Plasmodium falciparum Alters Intracellular pH", The Journal of Biological Chemistry, vol. 277, No. 40, Oct. 4, 2002 (pp. 37747-37755).
Piruska, et al., "The autofluorescence of plastic materials and chips measured under laser irradiation", The Royal Society of Chemistry, Lap Chip, vol. 5, 2005 (pp. 1348-1354).
An International Search Report and a Written Opinion both dated Jan. 15, 2016, for International Application No. PCT/IL2015/050864.
An International Search Report and a Written Opinion both dated Feb. 12, 2015, for International Application No. PCT/IL2014/050770.
An International Search Report and a Written Opinion both dated Apr. 18, 2013, for International Application No. PCT/IL2012/050556.
An International Search Report and a Written Opinion dated Jul. 27, 2012 for International Application No. PCT/IL2011/000973.
A Final Office Action dated Jul. 29, 2019 which issued during the prosecution of U.S. Appl. No. 14/914,329.
A European Search Report dated Mar. 23, 2017. which issued during the prosecution of Applicant's European App No. 14839661.7.
A European Search Report dated Dec. 14, 2016 which issued during the prosecution of Applicant's European App No. 14800352.8.
Yang, Ming et al.; "A Rapid Auto-Focus Method in Automatic Microscope." Signal Processing, 2008. ICSP 2008. 9th International Conference on. IEEE,2008.
Wu, Qiang, et al; Microscope Image Processing. Chapter 16, Autofocusing, pp. 441-467, Academic Press, 2010.
Wu, Caicai et al.; "Feasibility study of the spectroscopic measurement of oxyhemoglobin using whole blood without pre-treatment", The Analyst, Mar. 1998, pp. 477-481, vol. 123 (5 pages total).
Wright, J H.; "A Rapid Method for the Differential Staining of Blood Films and Malarial Parasites" Journal of medical research vol. 7,1 (1902): 138-44.
Vink, J.P. et al.; "An automatic vision-based malaria diagnosis system", Journal of Microscopy 250.3 (2013):166-178.
Thun et al.; "Blood Parasite Identification Using Feature Based Recognition." Electrical Engineering and Informatics (ICEEI), 2011 International Conference on. IEEE, 2011.
Tek, F. Boray, et al.; "Computer Vision for Microscopy Diagnosis of Malaria." Malaria Journal 8.1 (2009): 153.
Sun, Yu, et al.; "Autofocusing algorithm selection in computer microscopy", 2005 IEEE/RSJ International Conference on Intelligent Robots and Systems.
Shute G. T et al.; "Identification of malaria parasites by fluorescence microscopy and acridine orange staining", Bulletin of the World Health Organ. 1973; 48(5): 591-596.
Shen, Feimo, et al.; "Digital autofocus method for automated microscopy", Methods in Enzymology vol. 414, 2006, pp. 620-632.
Purwar, Yashasvi, et al.; "Automated and Unsupervised Detection of Malarial Parasites in Microscopic Images." Malaria Journal 10.1 (2011): 364.
Price Jeffrey H. and David A. Gough, "Comparison of phase-contrast and fluorescence digital autofocus for scanning microscopy", Cytometry 16.4 (1994) 283-297.
Poon et al.,; "Automated Image Detection and Segmentation in Blood Smears", [Cytometry 1992 13:766-774].
Pasini, Erica M. et al.' "A novel live-dead staining methodology to study malaria parasite viability"; Malaria Journal 2013 12:190.
Osibote, O. A., et al.; "Automated focusing in bright-field microscopy for tuberculosis detection", Journal of Microscopy 240.2 (2010)pp. 155-163.

(56) References Cited

OTHER PUBLICATIONS

Ortyn, William E.,et al.; "Extended Depth of Field Imaging for High Speed Cell Analysis." Cytometry Part A 71.4, (2007): 215-231.

Merchant et al.; "Computer-Assisted Microscopy", The essential guide to image processing, Chapter 27, pp. 777-831, Academic Press, (2009).

Mendiratta, D.K. et al.; Evaluation of different methods for diagnosis of P. falciparum malaria; Indian J Med Microbiol. Jan. 2006;24(1):49-51.

Kumar, Amit et al.; "Enhanced Identification of Malarial Infected Objects using Otsu Algorithm from Thin Smear Digital Images." International Journal of Latest Research in Science and Technology vol. 1,Issue 2 : pp. 159-163, Jul.-Aug.(2012).

Keiser, J. et al.; "Acridine Orange for malaria diagnosis: its diagnostic performance, its promotion and implementation in Tanzania, and the implications for malaria control", Annals of Tropical Medicine and parasitology, 96.7 (2002): 643-654.

Kawamoto, F.; "Rapid diagnosis of malaria by fluorescence microscopy with light microscope and interference filter", The Lancet, vol. 337, pp. 200-202, Jan. 26, 1991.

Kawamoto, F. and P.F.Billingsley; "Rapid diagnosis of malaria by fluorescence microscopy", Parasitology Today, 8.2 (1992): 69-71.

Joanny, Fanny, et al; "In Vitro Activity of Fluorescent Dyes against Asexual Blood Stages of Plasmodium falciparum'"DOI: 10.1128/AAC.00709-12.

Jahanmehr, S A H et al.; "Simple Technique for Fluorescence Staining of Blood Cells with Acridine Orange", Journal of Clinical Pathology, Feb. 12, 1987, pp. 926-929 (4 pages total).

Jager et al.; "Five-minute Giemsa stain for rapid dedtection of malaria parasites in blood smears", Tropical Doctor, Vo. 41, pp. 33-35, Jan. 2011.

Guy, Rebecca, et al.; "The use of fluorescence enhancement to improve the microscopic diagnosis of falciparum malaria", Malaria Journal 2007 6:89, https://malariajournal.biomedcentral.com/articles/10.1186/1475-2875-6-89, (Jul. 9, 2007).

Gordon, Andrew et al.; Supplementary Note to Gordon et al.: "Single-cell quantification of molecules" Nature Methods, Jan. 21, 2007, pp. 1-35.

Gordon, Andrew et al.; "Single-cell quantification of molecules" Nature Methods 4, Jan. 21, 2007, pp. 175-181.

Garcia, et al. ; "Laboratory Diagnosis of Blood-borne Parasitic Diseases; Approved Guideline"; Nccls Documents M115-a, Jun. 2000.

Gallo, V., et al.; "Simultaneous determination of phagocytosis of Plasmodium falciparum-parasitized and non-parasitized red blood cells by flow cytometry"; Malaria Journal 2012 11:428.

Frean, John;. "Microscopic Determination of Malaria Parasite Load: Role of Image Analysis." Microscopy: Science, technology, Applications, and Education (2010): 862-866.

Fohlen-Walter, Anne PhD, et al.; "Laboratory Identification of Cryoglobulinemia From Automated Blood Cell Counts, Fresh Blood Samples, and Blood Films", American Society for Clinical Pathology, Am J Clin Pathol, 2002, pp. 606-614, vol. 117 (9 pages total).

Chong, Shau Poh, Shilpa Pant, and Nanguang Chen. "Line-scan Focal Modulation Microscopy for Rapid Imaging of Thick Biological Specimens." SPIE/OSA/IEEE Asia Communications and Photonics. International Society for Optics and Photonics, 2011.

Chiodini, P.L. et al.; "Rapid diagnosis of malaria by fluorescence microscopy"; The Lancet, vol. 337, Issue 8741, P624-625, Mar. 9, 1991.

"Blood specimens:Microscopic Examination", Centers for Disease Control and Prevention CDC, Diagnostic Procedures, 2009, <http://www.dpd.cdc.gov/dpdx/HTML/Frames/DiagnosticProcedures/body_dp_bloodexamin.htm>.

Brenner et al.; An Automated Microscope for Cytologic Research a Preliminary Evaluation, [The Journal of Histochecmistry and Cytochemistry, vol. 24, No. 1, pp. 100-111, 1976.

Bovik, Alan C., et al.; "The Essential Guide to Image Processing", Chapter 27, "Computer Assisted Microscopy",pp. 777-831; Academic Press, 2009.

Biéler, Sylvain et al. "Improved detection of Trypanosoma brucei by lysis of red blood cells, concentration and LED fluorescence microscopy"; Acta Tropica; vol. 121, Issue 2, Feb. 2012, pp. 135-140.

Anand, A., et al. ; "Automatic Identification of Malaria-Infected RBC with Digital Holographic Microscopy Using Correlation Algorithms." Photonics Journal, IEEE 4.5 (2012): 1456-1464.

An Office Action dated Aug. 24, 2020 for U.S. Appl. No. 16/098,893.
An Office Action dated Jun. 23, 2020 for U.S. Appl. No. 16/706,159.
U.S. Appl. No. 61/870,106 filed Aug. 26, 2013.
Notice of Allowance dated Jul. 20, 2019 in U.S. Appl. No. 15/506,997.
Centers for Disease Control and Prevention. DPDx—Laboratory Identification of Parasitic Diseases of Public Health Concern <http://www.cdc.gov/dpdx/diagnosticProcedures/blood/microexam.html>, Nov. 29, 2013.

An Office Action in Indian Application 3592/MUMNO/2015 mailed Dec. 24, 2018. 4 pages.
An Office Action dated Sep. 25, 2015, which issued during the prosecution of U.S. Appl. No. 13/338,291.
An Office Action dated Oct. 29, 2014, which issued during the prosecution of U.S. Appl. No. 13/338,291.
An Office Action dated Nov. 16, 2018 which issued during the prosecution of U.S. Appl. No. 14/914,329.
An Office Action dated Mar. 23, 2018 which issued during the prosecution of Indian Patent Application No. 4263/DELNP/2014.
An International Search Report and a Written Opinion both dated Oct. 30, 2014, for International Application No. PCT/IL2014/050585.
An International Search Report and Written Opinion in International Application No. PCT/IB2018/058861, issued on Apr. 8, 2019.
An International Search Report and Written Opinion, dated Aug. 30, 2017 from the International Bureau in counterpart International application No. PCT/IL2017/050526.
An International Search Report and Written Opinion, dated Aug. 8, 2017 from the International Bureau in counterpart International application No. PCT/IL2017/050523.
An International Search Report and Written Opinion, dated May 18, 2017 from the International Bureau in counterpart International application No. PCT/IL2017/050363.
An Office Action dated Apr. 2, 2015, which issued during the prosecution of U.S. Appl. No. 13/338,291.
An Office Action dated Apr. 4, 2019 which issued during the prosecution of U.S. Appl. No. 14/914,329.
An Office Action dated Dec. 24, 2018 which issued during the prosecution of Indian Patent Application No. 3592/2012.
An Office Action dated Feb. 22, 2018 which issued during the prosecution of U.S. Appl. No. 14/369,251.
An Office Action dated Jan. 10, 2018. which issued during the prosecution of U.S. Appl. No. 15/083,610.
An Office Action dated Jan. 28, 2019 which issued during the prosecution of U.S. Appl. No. 15/174,490.
An Office Action dated Jan. 31, 2019 which issued during the prosecution of Indian Patent Application No. 5069/DELNP/2012.
An Office Action dated Jun. 15, 2018 from the United States Patent and Trademark Office in copending U.S. Appl. No. 14/369,251.
An Office Action dated Jun. 29, 2018 from the United States Patent and Trademark Office in copending U.S. Appl. No. 15/174,490.
An Office Action dated Jun. 4, 2019, which issued during the prosecution of U.S. Appl. No. 14/369,251.
An Office Action dated Jun. 5, 2019, which issued during the prosecution of U.S. Appl. No. 15/174,490.
An Office Action dated Aug. 24, 2020 which issued during the prosecution of U.S. Appl. No. 16/098,893.
Bonnekoh, Bernd, et al. "Profiling lymphocyte subpopulations in peripheral blood under efalizumab treatment of psoriasis by multi epitope ligand cartography (MELC) robot microscopy", European Journal of Dermatology, 2006, vol. 16, Issue 6, 3 pages total.
A Chinese Office Action dated May 23, 2024 which issued during the prosecution of Application No. 202080073583.4.
A Chinese Office Action dated May 23, 2024 which issued during the prosecution of Application No. 202080073623.5.
A combined Search and Examination Report issued for EP 20828313.5 on Sep. 11, 2024.

(56) References Cited

OTHER PUBLICATIONS

Horton, A. P., K. Kumar, H. Liu, L. Cheng, N. Lane, E. Taylor, H. R. Garner, J. W. Uhr, and X. J. Zhang. "Quantitative immunophenotyping of circulating tumor cells in blood using microfluidic screening chip integrated with hyperspectral microscope." In Transducers 2009-2009 International Solid-State Sensors, Actuators and Microsystems Conference, pp. 77-80. IEEE, 2009. (4 pages).
An Invitation to Pay Additional Search Fees issued on Jul. 10, 2024 by the WIPO for PCT/IB2024/054798.
A Japanese Office Action dated Jul. 1, 2024 which issued during the prosecution of Application No. 2022-521112.
A Japanese Office Action dated Jul. 3, 2024 which issued during the prosecution of Application No. 2022- 521238.
Niehues T, Kapaun P, Harms DO, Burdach S, Kramm C, Körholz D, Janka-Schaub G, Göbel U. A classification based on T cell selection-related phenotypes identifies a subgroup of childhood T-ALL with favorable outcome in the COALL studies. Leukemia. Apr. 1999; 13.
Non-Final Office Action dated Jul. 8, 2024 which issued during the prosecution of U.S. Appl. No. 18/397,324.
Notice of Allowance dated Aug. 7, 2024, which issued during the prosecution of U.S. Appl. No. 17/783,924.
Notice of Allowance dated Sep. 23, 2024, which issued during the prosecution of U.S. Appl. No. 18/203,109.
Notice of Allowance issued for U.S. Appl. No. 18/203,109 on Jun. 13, 2024.
An Office Action dated Aug. 15, 2024 which issued during the prosecution of U.S. Appl. No. 17/083,647.
An Office Action dated Sep. 3, 2024 which issued during the prosecution of Canadian Patent Application No. 3,081,669.
Examination Report dated Oct. 23, 2024 which issued during the prosecution of New Zealand Application No. 787745.
Examination Report dated Oct. 23, 2024 which issued during the prosecution of European Application No. 20828312.7.
Examination Report dated Oct. 31, 2024 which issued during the prosecution of New Zealand Application No. 787743.
Non-Final Office Action dated Sep. 28, 2024 which issued during the prosecution of U.S. Appl. No. 17/770,339.
Office Action dated Oct. 7, 2024 which issued during the prosecution of Japanese Patent Application No. 2022-534229.
Office Action dated Oct. 3, 2024 which issued during the prosecution of Japanese Patent Application No. 2022-534230.
Office Action dated Sep. 5, 2024 which issued during the prosecution of U.S. Appl. No. 18/214,568.
Office Action dated Aug. 19, 2024 which issued during the prosecution of U.S. Appl. No. 18/376,680.
International Search Report and Written Opinion issued for PCT Application No. PCT/IB2024/054798 on Sep. 2, 2024.
Japanese Office Action dated Nov. 11, 2024 which issued during the prosecution of Application No. 2022-521238.
Japanese Office Action dated Nov. 5, 2024 which issued during the prosecution of Application No. 2022-534369.
Japanese Office Action dated Nov. 7, 2024 which issued during the prosecution of Application No. 2022-521112.
Chinese Office Action dated Nov. 25, 2024 which issued during the prosecution of Application No. 202080073583.4.
Chinese Office Action dated Nov. 25, 2024 which issued during the prosecution of Application No. 202080073623.5.
Final Office Action dated Dec. 19, 2024, which issued during the prosecution of U.S. Appl. No. 17/063,320.
Final Office Action dated Dec. 30, 2024, which issued during the prosecution of U.S. Appl. No. 17/083,647.
Japanese Office Action dated Jan. 14, 2025 which issued during the prosecution of Application No. 2024-15207.
Novelli, Enrico M., et al. "Clinical predictors of severe malarial anaemia in a holoendemic Plasmodium falciparum transmission area." British journal of haematology 149.5.
Philip E. Thuma, Janneke van Dijk, Rick Bucala, Zufan Debebe, Sergei Nekhai, Thea Kuddo, Mehdi Nouraie, Günter Weiss, Victor R. Gordeuk, Distinct Clinical and Immunologic Profiles in Severe Malarial Anemia and Cerebral Malaria in Zambia, The Journal of Infectious Diseases, vol. 203, Issue 2, Jan. 15, 2011, pp. 211-219, https://doi.org/10.1093/infdis/jiq041.
Haroon H, Fazel PA, Naeem M, Mobin A, Naqvi AH, Makki K., "Hide and seek: hematological aspects of malaria—a developing country perspective", J. Infect. Dev. Ctries, 2013, vol. 7, No. 3, pp. 273-279.
Office Action dated Jan. 13, 2025 which issued during the prosecution of U.S. Appl. No. 18/214,568.
Office Action dated Jan. 13, 2025 which issued during the prosecution of U.S. Appl. No. 17/770,365.
Office Action dated Jan. 15, 2025 which issued during the prosecution of U.S. Appl. No. 17/836,561.
Examination Report dated Jan. 23, 2025 which issued during the prosecution of New Zealand Application No. 787745.
Chinese Office Action dated Jan. 27, 2025 which issued during the prosecution of Application No. 202080085480.X.
Rodrigo, 2015, Fast control of temporal and spatial coherence properties of microscope illumination using DLP projector JO—Progress in Biomedical Optics and Imaging—Proceedings of SPIEER.
Pan, 2020, High-resolution and large field-of-view Fourier ptychographic microscopy and its applications in biomedicine, Reports on Progress in Physics, vol. 83, No. 9.
Invitation to pay fees and Partial Search Report for PCT Application No. PCT/IB2024/062064 dated Feb. 25, 2025.
Chinese Office Action dated Feb. 27, 2025 which issued during the prosecution of Application No. 202080085933.9.
Final Office Action dated Mar. 11, 2025 which issued during the prosecution of U.S. Appl. No. 18/376,680.
Office Action dated Mar. 13, 2025 which issued during the prosecution of U.S. Appl. No. 17/783,831.
Office Action dated Mar. 5, 2025 which issued during the prosecution of Japanese Patent Application No. 2022-534230.

* cited by examiner

DISTINGUISHING BETWEEN ENTITIES IN A BLOOD SAMPLE

CROSS-REFERENCE TO RELATED APPLICATION

This application is a continuation of U.S. Ser. No. 14/914,329 (published as US 2016/0246046) to Yorav Raphael, which is a US national phase application of PCT Application No. PCT/IL/2014/050770 to Yorav (published as WO 15/029032), filed Aug. 26, 2014, which claims the benefit of U.S. Provisional Application No. 61/870,106, filed on Aug. 26, 2013, titled Digital Microscopy Systems, Methods and Computer Program Products, which is hereby incorporated by reference herein.

TECHNOLOGICAL FIELD

The present disclosure relates to the field of digital microscopy.

BACKGROUND

When using a digital microscope system to examine a sample, it may be desirable to shorten as much as possible the duration of the examination. For instance, reducing the duration of the examination may allow a higher throughput for a given digital microscope, and/or may therefore allow a smaller number of digital microscope(s) to examine a predetermined number of samples than if the throughput were lower.

When the sample includes a parasite and examination of the sample may allow diagnosis of a parasitic infection, such as malaria or a Babesiosis infection, a shortened examination duration which leads to a more rapid diagnosis may be especially appreciated. Parasites are estimated to infect around one third of the world population, and diseases caused by parasites are estimated to cause millions of deaths worldwide, immense suffering, and economic costs.

SUMMARY

In accordance with the presently disclosed subject matter, there is provided a digital microscopy method, comprising: capturing a plurality of overlapping images of a sample, wherein the capturing of at least one of the plurality of images is performed while the sample and a focal plane are in relative motion along an optical axis at a speed greater than zero; and processing the plurality of images using a reference criterion to determine a reference relative arrangement of the focal plane and the sample along the optical axis.

In some embodiments of the method, the overlapping images are completely overlapping.

In some embodiments of the method, the plurality of images is characterized by different image capture densities along the optical axis.

In some embodiments, the method comprises varying a speed of the relative motion.

In some embodiments, the method comprises providing an estimated relative arrangement, wherein varying the speed comprises decelerating to provide a decreased speed of relative motion when a relative arrangement of the focal plane and the sample corresponds or is in proximity to the estimated relative arrangement.

In some embodiments of the method, the speed of the relative motion is at a minimum value when a relative arrangement of the focal plane and the sample corresponds or is in proximity to the estimated relative arrangement.

In some embodiments of the method, the speed of the relative motion is zero when a relative arrangement of the focal plane and the sample corresponds or is in proximity to the estimated relative arrangement.

In some embodiments, the method comprises providing an estimated relative arrangement, wherein varying the speed comprises accelerating to provide an increased speed of relative motion when the relative arrangement of the focal plane and the sample corresponds to a relative arrangement other than the estimated relative arrangement.

In some embodiments, the method comprises providing an estimated relative arrangement, wherein varying the speed comprises decelerating before the relative arrangement of the focal plane and the sample corresponds to the estimated relative arrangement and accelerating after the relative arrangement of the focal plane and the sample corresponds to the estimated relative arrangement.

In some embodiments, the method comprises providing an estimated relative arrangement, wherein varying the speed comprises decelerating as the relative arrangement of the focal plane and the sample grows closer to the estimated relative arrangement and accelerating as the relative arrangement of the focal plane and the sample moves away from the estimated relative arrangement.

In some embodiments of the method, the capturing comprises varying a rate of image capture.

In some embodiments, the method comprises providing an estimated relative arrangement, wherein varying the rate of image capture comprises increasing a rate of image capture to provide an increased rate when a relative arrangement of the focal plane and the sample corresponds or is in proximity to the estimated relative arrangement.

In some embodiments, the method comprises providing an estimated relative arrangement, wherein varying the rate of image capture comprises decreasing a rate of image capture to provide a decreased rate when a relative arrangement of the focal plane and the sample corresponds to a relative arrangement other than the estimated relative arrangement.

In some embodiments, the method comprises providing an estimated relative arrangement, wherein varying the rate of image capture comprises increasing a rate of image capture before the relative arrangement of the focal plane and the sample corresponds to the estimated relative arrangement and decreasing a rate of image capture after the relative arrangement of the focal plane and the sample corresponds to the estimated relative arrangement.

In some embodiments, the method comprises providing an estimated relative arrangement, wherein varying the rate of image capture comprises increasing a rate of image capture as the relative arrangement of the focal plane and the sample grows closer to the estimated relative arrangement and decreasing a rate of image capture as the relative arrangement of the focal plane and the sample moves away from the estimated relative arrangement.

In some embodiments of the method, at least one of the plurality of images is captured while a speed of the relative motion is greater than 10 μm/s.

In some embodiments of the method, relative motion is implemented at least partly by modifying a focal length.

In some embodiments of the method, relative motion is implemented at least partly by moving a sample holder.

In some embodiments of the method, relative motion is implemented at least partly by moving an optical module or a part thereof.

In some embodiments of the method, the reference criterion includes a drop in image contrast.

In some embodiments, the method comprises capturing at least one image of a sample when a relative arrangement of the focal plane and the sample along the optical axis corresponds to an investigation relative arrangement defined at least partly based on the reference relative arrangement.

In some embodiments of the method, the investigation relative arrangement is to defined as a relative arrangement shifted with respect to the reference relative arrangement.

In accordance with the presently disclosed subject matter, there is provided a digital microscope system, comprising: an imaging module including a sensor module configured to capture a plurality of overlapping images of a sample, wherein the capturing of at least one of the plurality of images is performed while the sample and a focal plane are in relative motion along an optical axis at a speed greater than zero; a carrier module configured to carry, support, comprise or have integrated within it a sample holder which is configured to accommodate the sample; a control module configured to implement the relative motion; and a processing module configured to process the plurality of images using a reference criterion to determine a reference relative arrangement of the focal plane and the sample along the optical axis.

In some embodiments of the system, the control module is configured to vary a speed of the relative motion.

In some embodiments of the system, the control module is configured to vary a rate of image capture.

In some embodiments of the system, the imaging module includes an optical module, wherein the relative motion is at least partly implemented by the control module performing at least one of changing a focal length associated with the optical module or moving the optical module or a part thereof.

In some embodiments of the system, the relative motion is at least partly implemented by the control module, by moving the sample holder.

In some embodiments, the system comprises a light source module.

In some embodiments, the system comprises an input module configured to receive input from any of an operator or a controller device for use by at least one of the processing module or control module.

In some embodiments, the system comprises an output module configured to provide output to any of an operator or control device regarding operation of the system.

In accordance with the presently disclosed subject matter there is provided a computer program product comprising a computer useable medium having computer readable program code embodied therein for performing a digital microscopy method, the computer program product comprising: computer readable program code for causing a computer to capture a plurality of overlapping images of a sample, wherein the capturing of at least one of the plurality of images is performed while the sample and a focal plane are in relative motion along an optical axis at a speed greater than zero; and computer readable program code for causing a computer to process the plurality of images using a reference criterion to determine a reference relative arrangement of the focal plane and the sample along the optical axis.

In some embodiments, the computer program product comprises computer readable program code for causing a computer to change a speed of the relative motion.

In some embodiments, the computer program product comprises computer readable program code for causing a computer to change a rate of image capture.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the subject matter. However, it will be understood by those skilled in the art that some examples of the subject matter may be practiced without these specific details. In other instances, well-known features, structures, characteristics, stages, methods, modules, elements, components, devices and/or systems have not been described in detail so as not to obscure the subject matter.

Usage of the term "one embodiment", "an embodiment", "some embodiments", "another embodiment", "other embodiments", "illustrated embodiments", "for example," "such as", "for instance", "e.g.", "possibly", "it is possible", "optionally", "say", "one example", "some examples", "another example", "other examples, "various examples", "one instance", "some instances", "another instance", "other instances", "one case", "some cases", "another case", "other cases", "may", "can", "could" or variants thereof is intended to convey that a particular described feature, structure, characteristic, stage, method, module, element, component, device and/or system may be included in at least one non-limiting embodiment of the subject matter, but may not necessarily be included in all embodiments of the subject matter. The appearance of the same term does not necessarily refer to the same embodiment(s).

The term "illustrated embodiments", is used to direct the attention of the reader to one or more of the figures, but should not be construed as necessarily favoring any embodiment over any other.

It should be appreciated that certain features, structures, characteristics, stages, methods, modules, elements, components devices and/or systems disclosed herein, which are, for clarity, described in the context of separate examples, may also be provided in combination in a single example. Conversely, various features, structures, characteristics, stages, methods, modules, elements, components, devices and/or systems disclosed herein, which are, for brevity, described in the context of a single example, may also be provided separately or in any suitable sub-combination.

Figure 1:
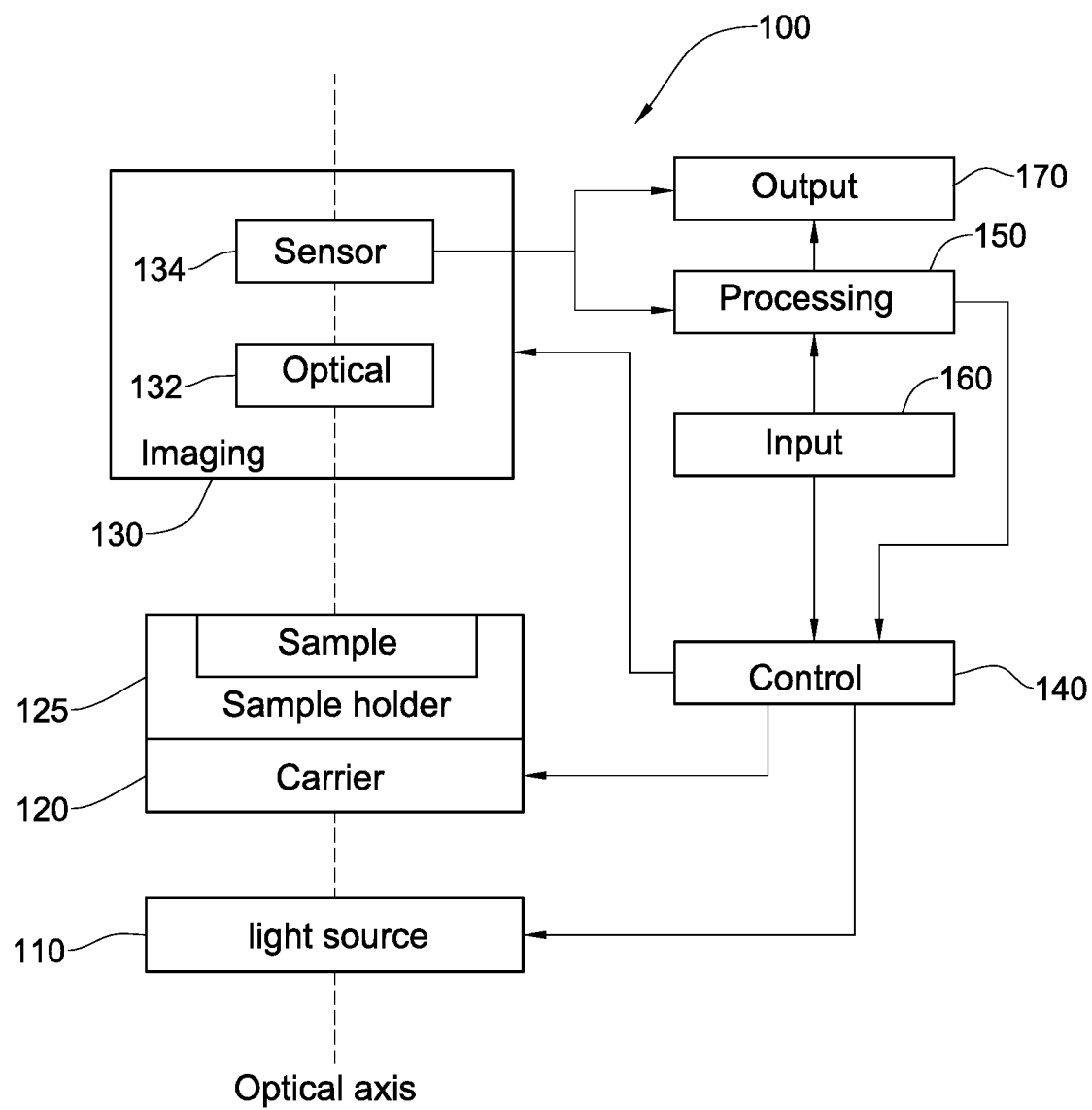
FIG. 1 is a block diagram of a digital microscope system, in accordance with some embodiments of the presently disclosed subject matter.

FIG. 1 is a block diagram of a digital microscope system 100, in accordance with some embodiments of the presently disclosed subject matter. Each module described as being included in digital microscope system 100 in a particular embodiment may be made up of any combination of hardware, software and/or firmware configured to perform the function(s) attributed to the module in that embodiment. The modules of system 100 may be centralized in one location or dispersed over more than one location.

In the illustrated embodiments, digital microscope system 100 may comprise one or more carrier module(s) 120, one or more imaging module(s) 130, one or more control module(s) 140, and one or more processing module(s) 150. For simplicity of description and illustration, the single form is used to refer to each of modules 120, 130, 140 and 150 and should be construed to include embodiments where there is one of each of these modules or a plurality of any of these modules.

Carrier module 120 may include any carrier known in the art (e.g. a microscope stage) configured to carry, support, comprise or have integrated within it one or more sample holder(s) 125 configured to accommodate one or more samples. For simplicity of description and illustration the single form is used to refer to each of module 125 and the sample, and should be construed to include embodiments where there is one module 125 or a plurality of modules 125 associated with carrier module 120, as well as embodiments where there is one sample or a plurality of samples associated with sample holder 125. Examples of any sample holder 125, may include a carrier slide, laboratory receptacle, dish, plate, multi-well plate, test tube (e.g. with or without a flat bottom), microfluidic cell and cartridge, a combination of any of the above, etc. There may or may not be variation in the surface of sample holder 125 accommodating the sample. The sample may be any type of sample, e.g. a biological sample.

In the illustrated embodiments, imaging module 130 may include one or more sensor module(s) 134 configured to capture a plurality of images of the sample, and one or more optical module(s) 132. For simplicity of description and illustration the single form is used to refer to each of modules 132 and 134 and should be construed to include embodiments where there is one of each of these modules or a plurality of any of these modules.

Sensor module 134 may include any image sensor known in the art for capturing an image, for example a charge-coupled-device (CCD), complementary metal-oxide-semiconductor (CMOS) sensor, matrix sensor, etc. Optical module 132 may include one or more optical components (e.g. lenses of various magnification levels, dichroic filters, excitation filters and/or emission filters) configured inter-alia to magnify so that an image of the sample captured by sensor module 132 may be magnified compared to the sample. The optical module 132 may be configured to be adjusted, as desired. For instance, the overall magnification of optical module 132 may be changed, for example by replacing a microscope lens. Additionally or alternatively, for instance, a focal length associated with optical module 132 may be changed and/or optical module 132 or a part thereof (e.g. one or more optical component(s)) may be moved, for instance in order to change the position of a focal plane along an optical axis.

Processing module 150 may be configured to process images captured by sensor module 134. It is not necessary that the captured images be transferred from imaging module 130 to processing module 150. For example, it is possible that the captured images may be stored in a computer readable medium and loaded/downloaded for processing by processing module 150. Additionally or alternatively, processing module 150 may be at least partly located in a same location as imaging module 130, and/or or may be at least partly located in a remote location from imaging module 130.

It should be understood that when it is stated herein that processing module 150 is configured to process images, processing module 150 may be configured to process any data relating to the images, for instance all of the data collected by sensor module 134 when capturing the images, part of the data collected by sensor module 134 when capturing the images, data derived from data collected by sensor module 134, and/or a combination of collected data and derived data. Optionally data is collected from a plurality of sensor modules 134. Processing module 150 may be configured to process images using at least one reference criterion in order to determine a reference relative arrangement (to be explained below) and/or for any other purpose. For simplicity of description, the single form is used to refer to a reference criterion and should be construed to include embodiments where there is one criterion or a plurality of criteria.

Control module 140 may be configured to control the operation of any module of digital microscope system 100. Control module 140 may include mechanical and/or electrical/electronic components for controlling operations. For instance control module 140 may be configured to implement relative motion of a focal plane and a sample along the optical axis. In embodiments where control module 140 implements relative motion, in order to implement the relative motion, control module 140 may be configured to change a focal length associated with optical module 132, to move optical module 132 or a part thereof (e.g. one or more optical component(s)), and/or to move sample holder 125 accommodating a sample (e.g. by moving and/or adjusting carrier module 120). For example, carrier module 120 may be adjusted among a plurality of different configurations, which may allow moving sample holder 125 without necessarily moving carrier module or a part thereof (e.g. when carrier module 120 includes an extendible member).

Control module 140 may be configured to control one or more parameter(s) relating to optical module 132, sensor module 134, and/or carrier module 120 (in addition to or instead of being configured to implement relative motion) such as: control a speed of relative motion; control start and/or end of image capturing; control a rate of image capture; control range of relative arrangements; and/or control relative arrangement(s), if any, associated with decelerating, accelerating, increasing rate of image capture and/or decreasing rate of image capture; control relative arrangement to correspond to investigation relative arrangement; and/or control magnification level, etc.

Optionally digital microscope system 100 may include one or more light source module(s) 110 and/or light may be provided by an element external to system 100. For simplicity of description and illustration the single form is used to refer to module 110, and should be construed to include embodiments where there is one module 110 or a plurality of modules 110. Light source module 110 may provide any type of light known in the art, and may be positioned to provide the light from any useful lighting direction (e.g. above and/or below the sample along the optical axis) as known in the art. For example, in some embodiments lighting may be provided from above the sample along the optical axis, and optical module 132 may be positioned below the sample along the same axis. Optionally, lighting may be provided from the same side of the sample along the optical axis at which optical module 132 is positioned. Optionally, lighting may be provided and optical module 132 may be present at both sides of the sample and used as required.

In examples where light source module 110 is included in digital microscope system 100, control module 140 may or may not control light source module 110, e.g. regarding the type of light. For example, control module 140 may control light source module 110 to provide different lighting conditions for different imaging purposes, such as different wavelengths and/or different bandwidths and/or different lighting directions. Optionally, lighting for brightfield imaging may be provided from the same side of the sample along the optical axis as optical module 132 is positioned, while florescent lighting may be provided across the sample.

Optionally, digital microscope system 100 may include an input module 160 for receiving input from an operator and/or from a controller device for use by processing module 150 and/or control module 140. Input module 160, when included, may comprise any appropriate input component(s), such as, keypad, mouse, keyboard, microphone, interface for receiving wired and/or wireless communication from a controller device, etc. Optionally digital microscope system 110 may include an output module 170 for providing output to an operator and/or to a controller device regarding operation of system 110, such as images captured by sensor 134 and/or data indicative of such images and/or derived from such data and/or results from processing by processing module 150. Output module 170, when included, may comprise any appropriate components(s), such as display, speaker, printer, interface for transmitting wired and/or wireless communication to a controller device, etc. When both are included, input module 150 and output module 170 or part(s) thereof, may or may not be combined, for instance in a touch-screen display, a combined interface, etc.

In some examples, at least part of digital microscope system 100 may comprise and/or be comprised in one or more computer(s) specially constructed for the desired purposes. Additionally or alternatively, in some examples at least part of digital microscope system 100 may comprise and/or be comprised in one or more computer(s) specially configured for the desired purposes by program code. In any of these examples such computer(s) may include at least some hardware. For instance, at least part of control module 140 and/or at least part of processing module 150 may comprise and/or be comprised in computer(s). The term "computer" should be construed to cover any kind of device with data processing capabilities.

Optionally, digital microscope system 100 may include fewer, more and/or different modules than shown in FIG. 1. In some embodiments, the functionality of system 100 may be divided differently among the modules illustrated in FIG. 1. At times, the functionality of system 100 described herein may be divided into fewer, more and/or different modules than shown in FIG. 1 and/or system 100 may in some embodiments include additional, less, and/or different functionality than described herein. For instance, control module 140 or any part thereof may be integrated into or with one or more other module(s) in system 100 such as imaging module 130, light source module 110, carrier module 120, input module 160, output module 170 and/or processing module 150, etc.

Examination with a digital microscope system such as system 100 may include at least one focusing stage and at least one investigation stage. For simplicity of description, the single form is used to refer to the focusing stage and the investigation stage and should be construed to include embodiments where there is one of each of these stages or a plurality of one or both of these stages. The focusing stage may be used to define at least one investigation relative arrangement of the focal plane and the sample along the optical axis for capturing one or more images during the investigation stage. It therefore follows that a longer focusing stage may possibly delay the investigation stage and/or lengthen the duration of the examination whereas a shorter focusing stage may possibly advance the investigation stage and/or shorten the duration of the examination.

For simplicity's sake it is assumed, in some of the examples below, that the sample is in an essentially x-y plane, the optical axis is a z axis, and the focal plane is an x-y plane, but in some other examples, the optical axis may be a different axis (e.g. x, y) perpendicular to the plane of the sample, with the focal plane parallel to the plane of the sample, mutatis mutandis.

Figure 2A:
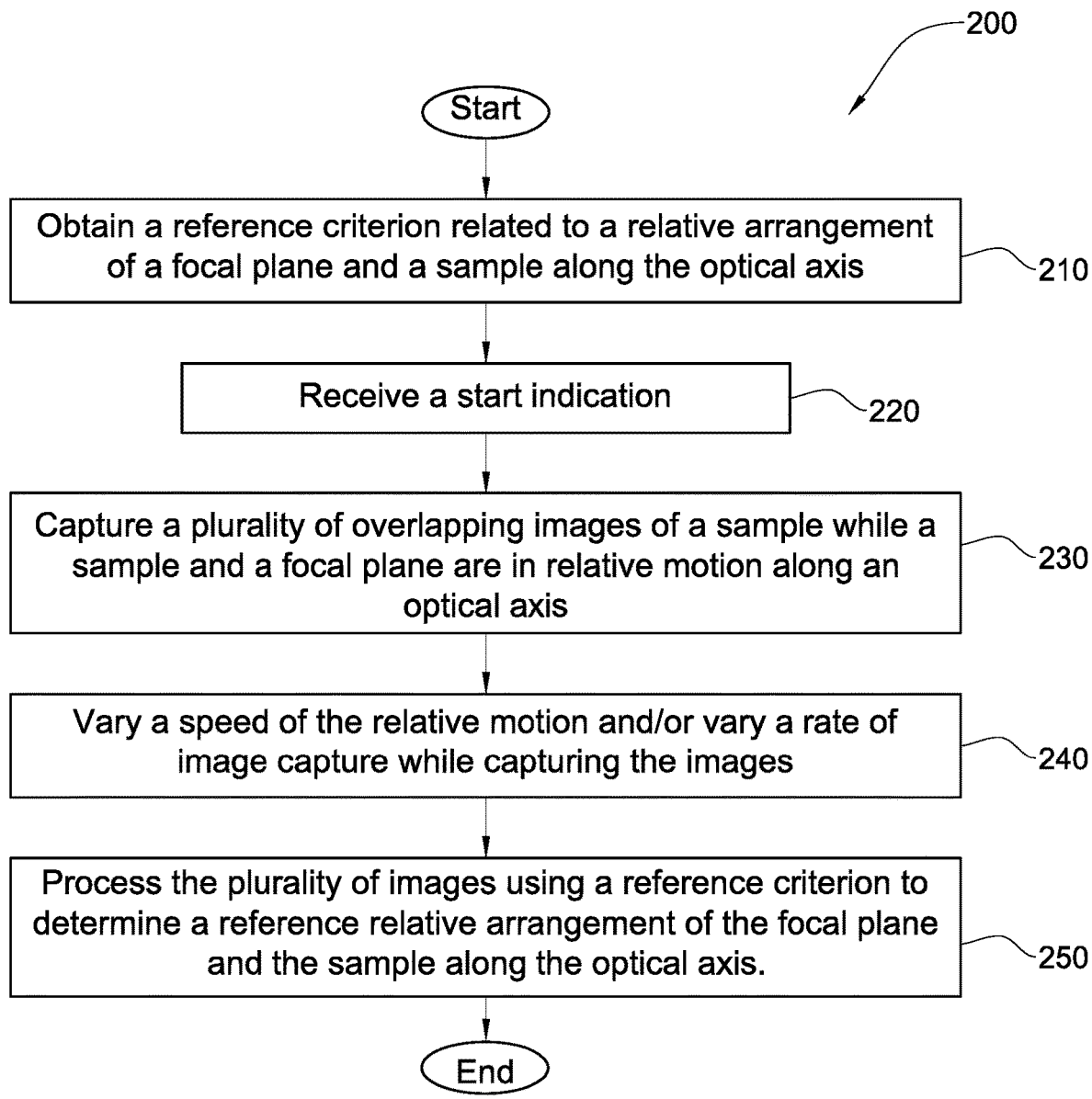
FIG. 2A is a flowchart of a method of digital microscopy, in accordance with some embodiments of the presently disclosed subject matter.

FIG. 2A is a flowchart of a method 200 of digital microscopy, in accordance with some embodiments of the presently disclosed subject matter. Method 200 or a part thereof may be performed by a digital microscope system such as system 100. Method 200 or a part thereof may be included in a focusing stage of sample examination.

In the illustrated embodiments in stage 210, a reference criterion may be obtained relating to a relative arrangement of a focal plane and a sample along an optical axis. For instance, the reference criterion may be obtained by processing module 150, e.g. from an operator and/or controller device via input module 160, and/or may be based on a stored value from a previous iteration of method 200. The reference criterion may be any reference criterion such as drop in image contrast, maximum contrast, and/or maximum sharpness etc. Some examples of drop in image contrast in digital microscopy are described in International Application Number PCT/IL2014/050423 filed on May 14, 2014, titled "Method and System for Imaging a Cell Sample" (published as WO 14/188405 to Greenfield), which is hereby incorporated by reference herein. These examples will be elaborated upon further below with reference to FIG. 5. Stage 210 may take place at any time prior to the reference criterion being used in stage 250, and not necessarily as illustrated in FIG. 2A.

In the illustrated embodiments, in optional stage 220, a start indication may be received. For instance control module 140 may receive a start indication, e.g. from an operator and/or a controller device via input module 160. In this instance, control module 140 may then allow the transition to stage 230, thereby controlling the start of image capturing. Alternatively, stage 230 may be performed without stage 220 first being performed.

In stage 230, a plurality of overlapping images of the sample may be captured, for instance by a sensor module such as sensor module 134. The plurality of images of the sample that are captured may not necessarily be of the entire sample, and therefore the plurality of images may be of the entire sample and/or of a portion of the sample. The overlapping images may be completely overlapping (e.g. if each image is of exactly the same focusing field or specific location) and/or partly overlapping. For example, at least 50% of the field covered by each image in a set of a plurality of overlapping images may be overlapping. Optionally, at least 95% of the field covered by each image in a set of a plurality of overlapping images may be overlapping. The capturing of at least one of the plurality of images may be performed while the focal plane and sample are in relative motion along the optical axis at a speed greater than zero. For instance, one or more of the plurality of images may be captured while the focal plane is moving e.g. due to changing focal length and/or the moving of an optical module such as optical module 132 or a part thereof. Additionally or alternatively, for instance, one or more images may be captured while the sample is moving e.g. due to the moving of a sample holder such as sample holder 125 (for instance by way of moving and/or adjusting an associated carrier module such as carrier module 120). Although relative motion at a speed greater than zero may equal any speed greater than zero, in some embodiments at least one image may be captured in stage 230 while the speed of relative motion is greater than e.g. 1 µm/s, 10 µm/s, 50 µm/s, 100 µm/s, a predetermined percentage of maximum speed obtainable by a digital microscope system such as system 100, etc. If during the relative motion there may be one or more times that both the focal plane and sample may be stationary, at least one of the overlapping images may or may not be captured while the focal plane and sample are both stationary.

Herein, when referring to relative motion of a focal plane and a sample, the focal plane referred to is the focal plane associated with a particular imaging module (e.g. imaging module 130) which includes a particular sensor module (e.g. sensor module 134) that is configured to capture a plurality of overlapping images of the sample, where the capturing of at least one of said plurality of images is performed while the sample and the focal plane are in relative motion along an optical axis at a speed greater than zero.

It is noted that conventionally during the focusing stage when examining a sample, the position of the focal plane and/or the position of the sample along the optical axis may be changed in steps. After each step, when the focal plane and sample are stationary, an image may be captured of the sample. In contrast, in current method 200, where at least one image is captured while the focal plane and sample are in relative motion along the optical axis at a speed greater than zero, the focusing stage may possibly be advantageously shortened compared to a conventional focusing stage. This focusing stage may be further shortened in embodiments where a plurality of different images is captured while the focal plane and sample are in relative motion along the optical axis at a speed greater than zero.

During the relative motion, assuming at least the focal plane is moving along the optical axis, the focal plane may for instance move along the optical axis in one direction or in both directions. During the relative motion, assuming the sample is additionally or alternatively moving along the optical axis, the sample may for instance move along the optical axis in one direction or in both directions. Therefore as a result of the relative motion the relative arrangement of the focal plane and sample along the optical axis may change. For instance, the range of relative arrangements covered by the relative motion (inclusive of start and ending relative arrangement(s)) may include any relative arrangement where the distance between a particular point of the sample and the focal plane in a certain direction along the optical axis is less than or equal to the largest distance for any relative arrangement covered by the relative motion, and/or any relative arrangement where the distance between the particular point of the sample and the focal plane in the opposite direction along the optical axis is less than or equal to the largest distance for any relative arrangement covered by the relative motion. The largest distance in each direction may or may not correspond to the relative arrangement at the respective start or ending of the relative motion. The focal plane and sample may be arranged in various relative arrangements within the range of the relative arrangements covered by the relative motion in a specific order or in any order.

The range of relative arrangements covered by the relative motion may vary. For instance, if the focal plane is moving, the two farthest apart positions of the focal plane along the optical axis may vary. Additionally or alternatively, if the sample is moving, for instance, the two farthest apart positions of the sample along the optical axis may vary. For example, the distance between the focal plane and the sample may be e.g. anywhere from around 5 micrometers to 1000 micrometers, anywhere from around 150 to 250 micrometers apart, less than around 50 micrometers apart, anywhere from around 10 to 30 micrometers apart, etc.

A relative arrangement of the focal plane and sample along the optical axis may be quantified in any manner. For instance, the relative arrangement may be quantified as the distance between a point on the sample (e.g. vertical midpoint) and the focal plane along the optical axis and an indication of direction, such as which of the focal plane and the point on the sample is closer to imaging module 130. Additionally or alternatively, for instance a relative arrangement may be quantified as the distance between a point on the sample and a particular fixed point (e.g. of light source module 110) in a direction along the optical axis and the distance between the focal plane and the same particular fixed point in a (same or opposite) direction along the optical axis. In the latter instance, if both the focal plane and the sample may move then there may be a plurality of equivalent distance combinations (distance between sample point/fixed point in a direction along the optical axis e.g. k, k−c, k+c, etc; distance between focal plane/fixed point in a direction along the optical axis e.g. l, l−c, l+c, etc, where k, l, c may be any value(s)) for the relative arrangement.

The focal plane and sample may be arranged in any particular relative arrangement only once from the time the relative motion begins until the time the relative motion ends (inclusive), or may be arranged in any particular relative arrangement one or more times from the beginning to end of the relative motion. Optionally, from the time the relative motion begins until the time the relative motion ends there may be one or more pauses in relative motion. A relative arrangement may be achieved more than once, for instance if the focal plane and/or sample return to the same position(s) along the optical axis (each position having the same distance in the same direction from the fixed point as before) and/or for instance if the focal plane and/or sample move to equivalent but different position(s) along the optical axis (each position corresponding to the same distance between a point on the sample and the focal plane in the same direction along the optical axis as before).

Images may be captured in any order and therefore two images captured consecutively may not necessarily correspond to closer relative arrangements than two images not captured consecutively. Optionally, images may be captured consecutively along the motion path. Even if two images captured consecutively correspond to closer arrangements than two images not captured consecutively, there may or may not be a fixed deviation in the relative arrangements between any two consecutively captured images, for instance depending on whether or not there is be a uniform image capture density (where density refers to number of images per length of optical axis). As used herein, a deviation in the relative arrangements between any two captured images means the difference between the relative arrangements at which each of the two images were captured. For example, this may relate to the distance between the respective positions of the focal plane and/or the sample. Optionally each relative arrangement may be defined in terms of the distance between the focal plane and sample and the deviation may be defined in terms of the difference between such distances.

Optionally, zero images may be captured for any particular relative arrangement, only one image may be captured for any particular relative arrangement, or one or more image(s) may be captured for any particular relative arrangement. For instance, more than one image may be captured for a particular relative arrangement if more than one image may be captured while the focal plane and sample remain in fixed relative position(s) (e.g. speeds of relative motion is zero), if additional image(s) may be captured as the focal plane and/or sample return to the same position(s) along the optical axis (e.g. each position having the same distance in the same direction from a fixed point as before) and/or if additional image(s) may be captured as the focal plane and/or sample move to equivalent but different position(s) along the optical axis (e.g. each position corresponding to the same distance between a point on the sample and the focal plane in the same direction along the optical axis as before).

Figure 3A:
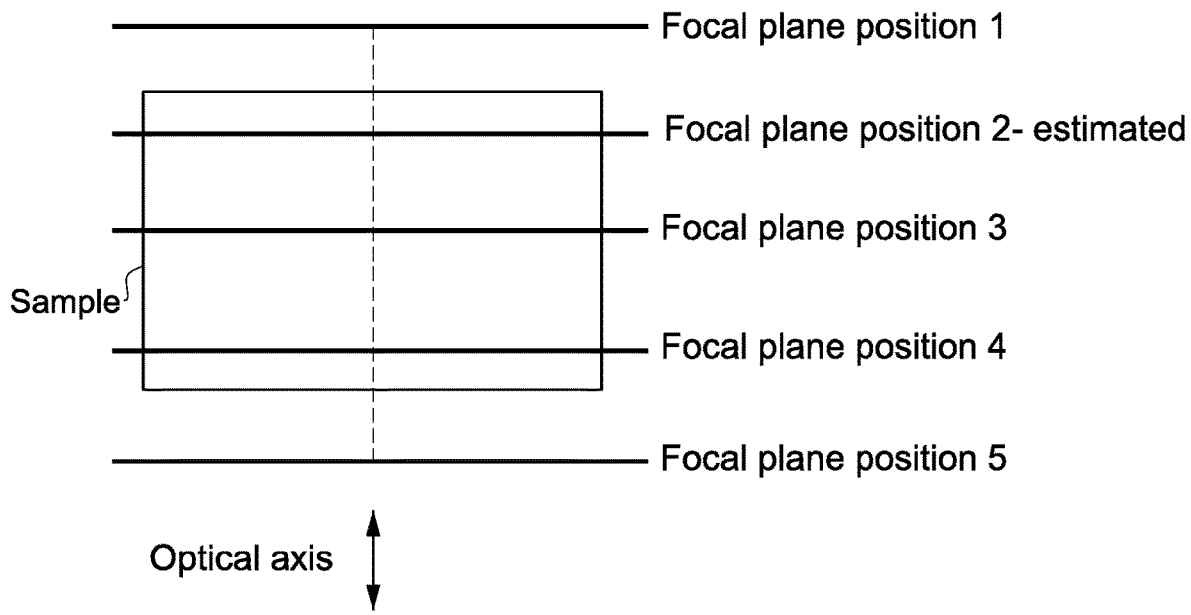
FIG. 3A illustrates various relative arrangements of a focal plane and a sample, in accordance with some embodiments of the presently disclosed subject matter.
Figure 3B:
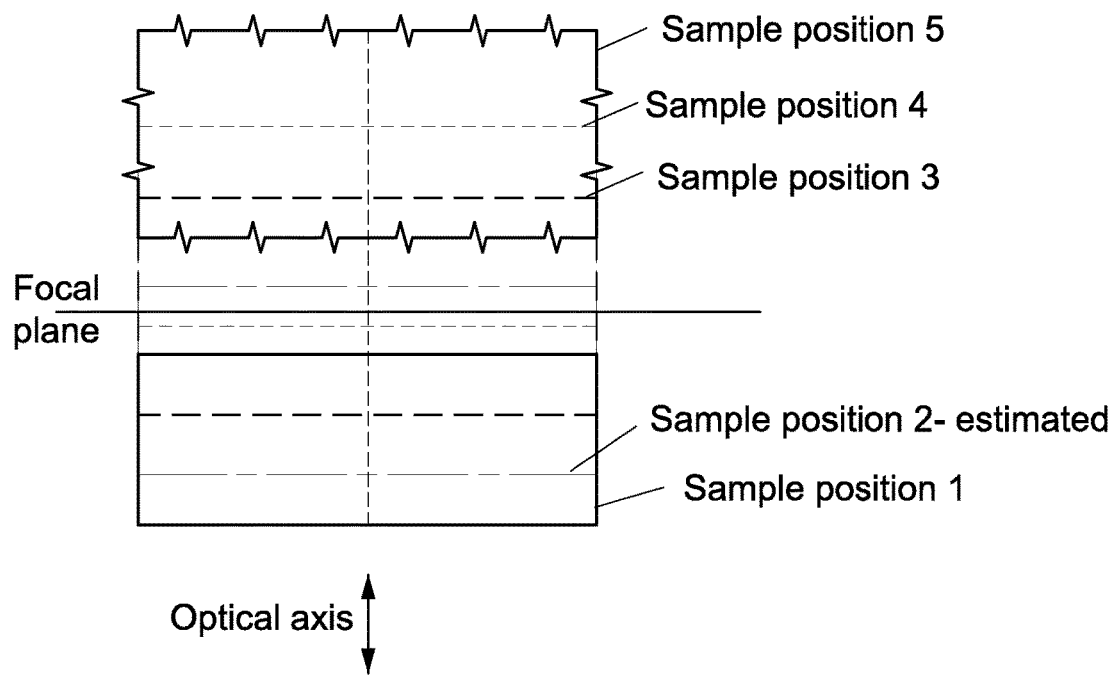
FIG. 3B illustrates various relative arrangements of a focal plane and a sample, in accordance with some embodiments of the presently disclosed subject matter.

Refer now to FIGS. 3A and 3B which each illustrates various relative arrangements of a focal plane and a sample, in accordance with some embodiments of the presently disclosed subject matter. In both FIGS. 3A and 3B there is illustrated relative motion of the sample and the focal plane. In FIG. 3A the focal plane is shown moving along the optical axis relative to a stationary sample, in a direction from imaging module 130 (from noted position 1 of focal plane to noted position 5 of focal plane). In FIG. 3B the sample is shown moving along the optical axis relative to a stationary focal plane in a direction toward the optical module (from noted position 1 of sample to noted position 5 of sample). For simplicity's sake, relative arrangement "u" may be considered to be associated with position "u" (e.g. of the focal plane in FIG. 3A or of the sample in FIG. 3B). The illustrated vertical dashed line in FIG. 3A or FIG. 3B indicates the range along the optical axis of relative arrangements inclusive from relative arrangement 1 to relative arrangement 5 where in FIG. 3A the position of the sample is illustrated as being stationary and the position of the focal plane may be at any noted position and/or anywhere between any two noted positions, and in FIG. 3B the position of the focal plane is illustrated as being stationary and the position of the sample may be at any noted position and/or anywhere between any two noted positions. The distance between illustrated noted positions is not meant to be necessarily representative of actual distance between, and the actual distances may vary.

FIGS. 3A and 3B also illustrate an "estimated relative arrangement" which may be relevant in some examples of the presently disclosed subject matter. In these examples, it may be assumed that prior to performing stage 230 a reference relative arrangement of the focal plane and sample may have been estimated (termed herein "estimated relative arrangement"). The estimated relative arrangement may have been provided, for instance to a control module such as control module 140 by an input module such as input module 160 and/or by a processing module such as processing module 150. For instance, referring to FIG. 3A, the estimated relative arrangement is illustrated as corresponding to noted position 2 of the focal plane. For instance, referring to FIG. 3B, the estimate relative arrangement is illustrated as corresponding to noted position 2 of the sample.

The relative motion illustrated in FIGS. 3A and 3B may not necessarily be exclusive of one another and in some other examples both the focal plane and the sample may move during the relative motion (sequentially and/or concurrently), with both moving for example in opposite directions or in the same direction. It is possible that in some examples, movement of any of the focal plane or sample may be in the opposite direction than described with reference to FIG. 3A or 3B respectively, movement of the focal plane may comprise movement by the focal plane in opposing directions, and/or movement of the sample may comprise movement by the sample in opposing directions.

As mentioned above the range of relative arrangements covered by the relative motion may vary. In some embodiments, the focusing stage may possibly be advantageously shortened by narrowing the range of relative arrangements covered by the relative motion compared to a focusing stage where there may be a wider range of relative arrangements. For example, a range of relative arrangements may be defined based at least partly on an estimated relative arrangement, (if provided), and this defined range may be a narrower range compared to a possible (wider) range, e.g. compared to a range allowed by a digital microscope system such as microscope system 100. Continuing with this example, assume that the estimated relative arrangement quantifies the focal plane as being a distance of x away from a fixed point (e.g. light source module 110) and quantifies a vertical midpoint of the sample as being a distance of y away from the fixed point (e.g. light source module 110), both in the same particular direction away from the fixed point (e.g. light source module 110). In this example, a range of relative arrangements based at least partly on the estimated relative arrangement and which assumes the focal plane is moving and the sample is stationary may be bounded by relative arrangements associated for instance with distances of x−a and x+b between the focal plane and the fixed point (e.g. light source module 110) in a particular direction. Referring to FIG. 3A, and assuming for the sake of this example that FIG. 3A reflects a range of relative arrangements based at least partly on the estimated relative arrangement, x−a may correspond to position 5 and x+b may correspond to position 1. Variables x, y, a, b are not limited by the disclosure and may be any value(s), not necessarily the same or different from one another. For instance, x may or may not equal y, and a may or may not equal b. In some cases a and/or b may equal 5 micrometers, whereas in other cases a and/or b may equal other value(s). Additionally or alternatively, for example, a range of relative arrangements may be defined based at least partly on experience.

A range of relative arrangements which may be based at least partly on an estimated relative arrangement and/or experience is termed herein "expected reference range".

However in other embodiments, the range of relative arrangements may not be at least partly based on an estimated relative arrangement and/or experience.

In the illustrated embodiments, in optional stage 240, a speed of the relative motion may be varied while capturing the images and/or a rate of image capture may be varied while capturing the images.

In some embodiments of stage 240 varying a speed may include, for instance, decelerating to provide a decreased speed of relative motion when a relative arrangement of the focal plane and the sample corresponds to the estimated relative arrangement or is in proximity to the estimated relative arrangement. For example a relative arrangement may be deemed to be in proximity to the estimated relative arrangement when they are no more than one depth of focus (sometimes also known as "depth of field") apart. Although not necessarily so, in some cases, the speed of the relative motion between the focal plane and the sample may be at a minimum value when the relative arrangement of the focal plane and the sample corresponds to or is in proximity to the estimated relative arrangement. A minimum may be only a local minimum or may also be a global minimum. The decreased speed may be zero, near zero, or any decreased value. Optionally, the focal plane and sample may both be stationary. Referring to FIG. 3A, when the focal plane is at or in the proximity of position 2 (where the relative arrangement corresponds to the estimated relative arrangement) there may be a decreased or even minimum speed of the focal plane, whereas referring to FIG. 3B when the sample is at or in the proximity of position 2 (where the relative arrangement corresponds to the estimated relative arrangement) there may be a decreased or even minimum speed of the sample. If the decreased speed is zero, the focal plane of FIG. 3A may stop when at or in the proximity of position 2 whereas the sample of FIG. 3B may stop when at or in the proximity of position 2.

Additionally or alternatively, in some embodiments of stage 240 varying a speed may include, for instance, accelerating to provide an increased speed (e.g. maximum speed) of relative motion when the relative arrangement of the focal plane and the sample corresponds to a relative arrangement other than the estimated relative arrangement. A maximum may be only a local maximum or may also be a global maximum. Referring to FIG. 3A, when the focal plane is at a position other than position 2 (where the relative arrangement corresponds to the estimated relative arrangement) there may be an increased or even maximum speed of the focal plane, whereas referring to FIG. 3B when the sample is at a position other than position 2 (where the relative arrangement corresponds to the estimated relative arrangement) there may be an increased or even maximum speed of the sample.

Additionally or alternatively, in some embodiments of stage 240 varying a speed may include for instance decelerating as the relative arrangement of the focal plane and the sample grows closer to the estimated relative arrangement and/or before the relative arrangement corresponds to the estimated relative arrangement. Additionally or alternatively, in some embodiments of stage 240 varying a speed may include for instance accelerating as the relative arrangement of the focal plane and the sample moves away from the estimated relative arrangement and/or after the relative arrangement corresponds to the estimated relative arrangement. Referring to FIG. 3A, before the focal plane is at position 2 (where the relative arrangement corresponds to the estimated relative arrangement) and/or as the focal plane grows closer to position 2 there may be a deceleration of the focal plane, and after the focal plane is at position 2 (where the relative arrangement corresponds to the estimated relative arrangement) and/or as the focal plane moves away from position 2 there may be an acceleration of the focal plane. Referring to FIG. 3B before the sample is at position 2 (where the relative arrangement corresponds to the estimated relative arrangement) and/or as the sample grows closer to position 2 there may be a deceleration of the sample and after the focal plane is at position 2 where the relative arrangement corresponds to the estimated relative arrangement) and/or as the sample moves away from position 2 there may be an acceleration of the sample.

Optionally, the relative arrangement associated with decelerating (e.g. with the start of deceleration) and/or the relative arrangement associated with accelerating (e.g. with the start of acceleration) may or may not have been determined prior to decelerating and/or accelerating. For instance, the relative arrangement(s) associated with decelerating and/or accelerating may have been determined based on predetermined deviation(s) (zero and/or non-zero) from the estimated relative arrangement. For instance a relative arrangement associated with decelerating may be characterized by being achieved by the relative motion prior to the estimated relative arrangement and having a predetermined deviation from the estimated relative arrangement. Additionally or alternatively, a relative arrangement associated with accelerating may be characterized by being achieved by the relative motion at or in the proximity of the estimated relative arrangement and having a predetermined deviation from the estimated relative arrangement. When both may be relevant, the predetermined deviation for the relative arrangement associated with decelerating and the predetermined deviation for the relative arrangement associated with accelerating may or may not be the same.

Referring to FIG. 3A, the relative arrangement associated with decelerating may correspond, for instance, to the focal plane in noted position 1 and/or the relative arrangement associated with accelerating may correspond for instance to the focal plane in noted position 3. Referring to FIG. 3B the relative arrangement associated with decelerating may correspond, for instance, to the sample in noted position 1 and/or the relative arrangement associated with accelerating may correspond, for instance to the sample in noted position 3. Optionally, in FIG. 3A and/or FIG. 3B, acceleration may commence at or in the proximity of position 2. For instance, deceleration may commence when the focal plane and/or sample is at any position along the optical axis subsequent to the motion reaching an increased value (which may or may not be a maximum value). For instance, acceleration may commence when the focal plane and/or sample is at any position along the optical axis subsequent to the motion reaching a decreased value, where the decreased value may or may not be a zero value (stopped), and may or may not be a minimum value.

In some embodiments, where the relative arrangement associated with the decelerating and/or the relative arrangement associated with the accelerating may not have been previously determined, the decelerating and/or accelerating may occur randomly, and/or may occur at predetermined point(s) in time, measured for instance from the start of the relative motion.

Additionally or alternatively, in some embodiments of stage 240, varying a rate of image capture may include, for instance, increasing a rate of image capture to provide an increased rate (e.g. a maximum rate) when a relative arrangement of the focal plane and the sample corresponds to or is in proximity (e.g. no more than one depth of focus apart) to the estimated relative arrangement. Referring to FIG. 3A, the rate of image capture may be at an increased or even maximum rate when the focal plane is at or in proximity to position 2 (where the relative arrangement corresponds to the estimated relative arrangement), whereas referring to FIG. 3B the rate of image capture may be at an increased or even maximum rate when the sample is at or in proximity to position 2 (where the relative arrangement corresponds to the estimated relative arrangement). A maximum may be only a local maximum or may also be a global maximum.

Additionally or alternatively, in some embodiments of stage 240, varying a rate of image capture may include, for instance, decreasing a rate of image capture to provide a decreased rate (e.g. minimum rate) when the relative arrangement of the focal plane and the sample corresponds to a relative arrangement other than the estimated relative arrangement. Referring to FIG. 3A, when the focal plane is at a position other than position 2 (where the relative arrangement corresponds to the estimated relative arrangement) there may be a decreased or even minimum rate of image capture, whereas referring to FIG. 3B when the sample is at a position other than position 2 (where the relative arrangement corresponds to the estimated relative arrangement) there may be a decreased or even minimum rate of image capture. A minimum may be only a local minimum or may also be a global minimum.

Additionally or alternatively, in some embodiments of stage 240, varying a rate of image capture may include, for instance, increasing a rate of image capture as the relative arrangement of the focal plane and the sample grows closer to the estimated relative arrangement and/or before the relative arrangement corresponds to the estimated relative arrangement. Additionally or alternatively, in some embodiments of stage 240, varying a rate of image capture may include, for instance decreasing a rate of image capture as the relative arrangement of the focal plane and the sample moves away from the estimated relative arrangement and/or after the relative arrangement corresponds to the estimated relative arrangement. Referring to FIG. 3A, before the focal plane is at position 2 (where the relative arrangement corresponds to the estimated relative arrangement) and/or as the focal plane grows closer to position 2, there may be an increase in rate and after the focal plane is at position 2 (where the relative arrangement corresponds to the estimated relative arrangement) and/or as the focal plane moves away from position 2 there may be an decrease in rate. Referring to FIG. 3B before the sample is at position 2 (where the relative arrangement corresponds to the estimated relative arrangement) and/or as the sample grows closer to position 2 there may be an increase in rate, and after the sample is at position 2 (where the relative arrangement corresponds to the estimated relative arrangement) and/or as the sample moves away from position 2 there may be a decrease in rate.

Optionally, if the rate of image capture is varied, the relative arrangement(s) associated with increasing the rate of image capture (e.g. with the start of increasing) and/or the relative arrangement(s) associated with decreasing the rate of image capture (e.g. with the start of decreasing) may or may not have been determined prior to the increasing and/or decreasing. For instance, the relative arrangement(s) associated with increasing capture rate, and/or decreasing capture rate may have been determined based on predetermined deviation(s) (zero and/or non-zero) from the estimated relative arrangement. For instance a relative arrangement associated with increasing the capture rate may be characterized by being achieved by the relative motion prior to the estimated relative arrangement and having a predetermined deviation from the estimated relative arrangement. Additionally or alternatively, a relative arrangement associated with decreasing the capture rate may be characterized by being achieved by the relative motion at or in the proximity of the estimated relative arrangement and having a predetermined deviation from the estimated relative arrangement. When both may be relevant, the predetermined deviation for the relative arrangement associated with increasing the capture rate and the predetermined deviation for the relative arrangement associated with decreasing the capture rate may or may not be the same.

Referring to FIG. 3A, the relative arrangement associated with increasing the capture rate may correspond, for instance, to the focal plane in noted position 1 and/or the relative arrangement associated with decreasing the capture rate may correspond for instance to the focal plane in noted position 3. Referring to FIG. 3B the relative arrangement associated with increasing the capture rate may correspond, for instance, to the sample in noted position 1 and/or the relative arrangement associated with decreasing the capture rate may correspond, for instance to the sample in noted position 3. Optionally, in FIG. 3A and/or FIG. 3B, decreasing may commence at or in the proximity of position 2. For instance, the increasing may commence when the focal plane and/or sample is at any position along the optical axis, subsequent to the capture rate reaching a decreased value, where the decreased value may or may not be a zero, and may or may not be a minimum value. For instance, the decreasing may commence when the focal plane and/or sample is at any position along the optical axis subsequent to the capture rate reaching an increased value, where the increased value may or may not be a maximum value.

In some embodiments, where the relative arrangement associated with increasing the capture rate and/or the relative arrangement associated with decreasing the capture rate may not have been previously determined, the increasing of the capture rate, and/or decreasing of the capture rate may occur randomly, and/or may occur at predetermined point(s) in time, measured for instance from the start of the relative motion.

Stage 240 may not necessarily be performed in all embodiments. The speed of the relative motion may be maintained at a constant speed or may be varied, resulting in a variable speed. For example, the relative motion may occur at a constant speed or at a variable speed. Additionally or alternatively, the rate of image capture may be maintained at a constant rate or may be varied, resulting in a variable rate. Optionally the rate of acceleration and/or deceleration may be fixed or variable and may or may not be equal (but opposite) one to the other. Optionally the rate of increasing and/or decreasing of the capture rate may be fixed or variable and may or may not be equal (but opposite) one to the other.

In some embodiments, varying the speed of relative motion and/or varying the rate of image capture while capturing the images may result in different image capture densities along the optical axis. However, in other embodiments, there may be a uniform image capture density along the optical axis.

A control module such as control module 140 may or may not be involved in stages 230 and/or 240, for instance in accordance with data from an input module such as input module 160 and/or from a processing module such as processing module 150 to provided before and/or during method 200. For example a control module may or may not perform any of the following relating to stages 230 and/or 240: implement the relative motion (for instance by changing the focal length associated with an optical module such as optical module 130, moving optical module 132 or a part thereof [e.g. one or more optical component(s)] and/or moving a sample holder such as sample holder 125 accommodating a sample [e.g. by way of by way of moving and/or adjusting an associated carrier module such as carrier module 120], etc.); control a range of relative arrangements, control a speed of relative motion (e.g. maintain speed, vary speed, etc.); control a rate of image capture (e.g. maintain rate of image capture, vary rate of image capture, etc.); control the relative arrangement(s), if any, associated with the decelerating (e.g. with the start of decelerating), increasing the rate of image capture (e.g. with the start of increasing), accelerating (e.g. with the start of accelerating) and/or decreasing the rate of image capture; control when stage(s) 230 and/or 240 may end (e.g. control end of image capturing), etc.

In the illustrated embodiments in stage 250, the plurality of images may be processed using the reference criterion obtained in stage 210 in order to determine a reference relative arrangement of the focal plane and sample along the optical axis. For instance, a processing module such as processing module 150 may process the images. In some examples, the relative arrangement which fulfills or best fulfills the reference criterion may be defined as the reference relative arrangement. In some examples, the reference relative arrangement may not necessarily be a relative arrangement corresponding to a captured image. For instance an interpolated and/or extrapolated relative arrangement may be allowed to be defined at the reference relative arrangement in some of these examples.

The captured images may be provided for processing in real time (e.g. as each image is captured or after some or all images have been captured) or may be stored and provided (e.g. loaded/downloaded) for processing. Stage 250 may overlap in time, partially or completely, with any of the other stages of method 200 or any part thereof, or may be performed after the other stages of method 200 have been completed.

In some embodiments, method 200 or a part thereof may be repeated more than once. For example, method 200 may be repeated if the reference relative arrangement determined in stage 250 is not acceptable. For instance, assume that there is a predefined accuracy range, namely that the reference relative arrangement determined in stage 250 should be within a predefined accuracy range of the estimated relative arrangement. If the reference relative arrangement determined in stage 250 is found to be outside this accuracy range, method 200 or a part thereof may be repeated.

Although not necessarily so, in some examples the predefined accuracy range may be narrower than the range of relative arrangements covered by the relative motion. Assume in this instance, that the accuracy range may be defined based at least partly on the estimated relative arrangement, and that the estimated relative arrangement quantifies the focal plane as being a distance of x away from a fixed point (e.g. light source module 110) and quantifies a vertical midpoint of the sample as being a distance of y away from the fixed point (e.g. light source module 110) both in the same particular direction away from the fixed point (e.g. light source module 110). Further assuming the focal plane is moving and the sample is stationary, the predefined accuracy range may be bounded by relative arrangements associated e.g. with distances of x−i and x+j between the focal plane and the fixed point (e.g. light source module 110) in a particular direction. Variables x, y, j are not limited by the disclosure and may be any value(s), not necessarily the same or different from one another. For example, x may or may not equal y, and i may or may not equal j. In some cases where the range of relative arrangements may have a and/or b equal to 5 micrometers (see above), i and/or j may equal 2.5 micrometers, whereas in other cases (regardless of the values of a and/or b) i and/or j may equal other value(s). In this instance, with such a predefined accuracy range if the reference relative arrangement is associated with a distance of the focal plane from the fixed point (e.g. light source module 110) having any value in the range of x−i to x+j and is also associated with a distance of the sample from the fixed point (e.g. light source module 110) being y then the reference relative arrangement may be accepted, but otherwise method 200 or a part thereof may be repeated. In some examples where method 200 or a part thereof may be repeated, there may be a wider range of the relative arrangements covered by the relative motion during the repetition of the method than when the method was previously executed. In some of these examples, the wider range may make it more likely that an acceptable reference relative arrangement may be determined. In some of these examples, the option of using a narrower range initially which may possibly allow a shorter focusing stage, coupled with a possibility of repetition of method 200 or a part thereof when necessary, may perhaps provide a balance between time and accuracy.

In some embodiments, the reference relative arrangement determined by method 200 may be used, for instance, to determine an investigation relative arrangement of the focal plane and sample along the optical axis, at least partly based on the reference relative arrangement. The investigation relative arrangement may be determined, for instance, by a processing module 150. During an investigation stage, one or more (completely and/or partly) overlapping images may be captured where the relative arrangement of the focal plane and sample corresponds to the determined investigation relative arrangement. For instance, control module 140 may receive the investigation relative arrangement from processing module 150 and may control optical module 132 (e.g. change focal length, move optical module 132 or a part thereof) and/or carrier module 120 and associated sample holder 125 (e.g. move sample holder 125 by way of moving and/or adjusting associated carrier module 120) to achieve a relative arrangement corresponding to the investigation relative arrangement. The investigation relative arrangement may, for example, be equivalent to (e.g. be the same as) the reference relative arrangement or may, for example, be shifted with respect to the reference relative arrangement. It is noted that if the reference relative arrangement was quantified in a certain manner, an investigation relative arrangement which is equivalent to the reference relative arrangement may be achieved, which is quantified in the same manner, or which is equivalently quantified. For instance, if the reference relative arrangement was quantified as the distance between a focal plane and a certain point on the sample in a particular direction, then the investigation relative arrangement may be quantified as the same distance in the same direction. If the reference relative arrangement was additionally or alternatively quantified, for instance, as the distance k between the focal plane and a fixed point on the optical axis in a specific direction, and the distance l between a sample point and the fixed point in the same direction, then the investigation relative arrangement may also be quantified as distances k, l between the focal plane and the sample and the fixed point in the specific direction and/or may be quantified as distances with a certain alteration such as k+c, l+c, or k−c, l−c, etc. between the focal plane and the sample and the fixed point in the specific direction where k, l, c, are not limited by the disclosure and may be any value(s), not necessarily the same or different from one another.

In some embodiments, it is possible that during a focusing stage for a given sample, images may be captured for one or more specific location(s) on the sample and/or for one or more focusing field(s). In some of these embodiments, method 200 or a part thereof may be repeated for one or more of the specific locations and/or for each of the focusing field(s). Method 200 or a part thereof may be performed only once for each focusing field and/or for each of the one or more of the specific location(s), or may be performed one or more times for any field and/or specific location.

The reference relative arrangement determined for one focusing field may not necessarily be the same as the reference relative arrangement determined for another focusing field, even if the fields are adjacent. For instance, there may be variation in the internal surface of a sample holder (on which the sample is positioned), such as sample holder 125, which may possibly result in a determination of different reference relative arrangements for different focusing field(s) and/or specific location(s). The variation in the sample holder internal surface may be, for example, because the sample holder surface is slanted, uneven, and/or not smooth and/or because the sample holder is positioned such that the sample holder surface is not perpendicular to the optical axis. Hence, the focusing may need to be repeated (as part of a single stage or during a plurality of stages), e.g. for each focusing field and/or specific location, and if repeated there may be a cumulative effect on the duration of sample examination. It therefore follows that having a faster focusing stage, may be even more advantageous as the number of focusing field(s) and/or specific location(s) increases and/or may allow scanning a larger surface area within a given period of time, thereby potentially increasing accuracy. In some examples with a plurality of focusing fields, the estimated relative arrangement and/or expected range of relative arrangements for a certain field may be based at least partly on the reference relative arrangement(s) and/or range of relative arrangements of one or more other focusing field(s) which may possibly be adjacent to the certain field (e.g. where the reference relative arrangement(s) for the other focusing field(s) may have been previously determined by a processing module such as processing module 150 in iteration(s) of method 200 or a part thereof for the other field(s)). In some examples it may be predicted that the reference relative arrangements of a plurality of focusing fields on the same carrier module may lie within a linear plane. In some examples, two adjacent focusing fields may not abut (instead there may be a distance between the adjacent focusing fields), however in some other examples two adjacent focusing fields may abut and/or may partially overlap.

Figure 4:
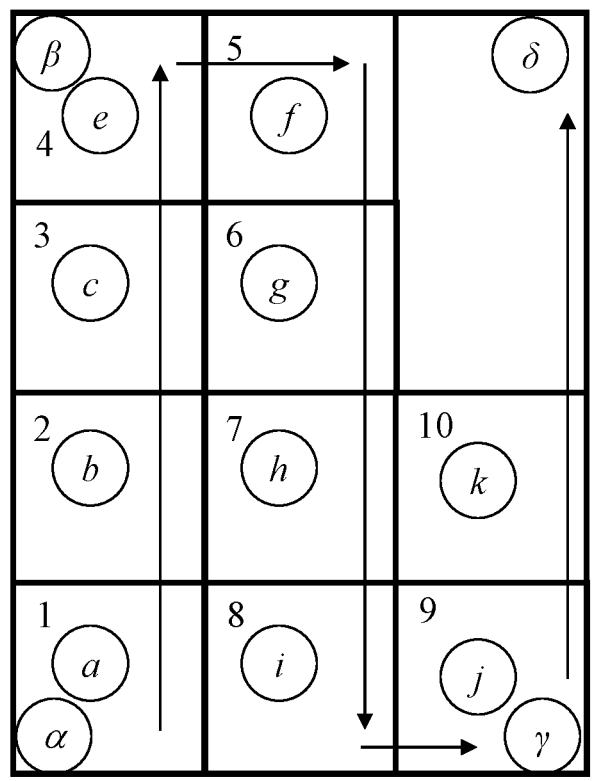
FIG. 4 illustrates some fields and specific locations, in accordance with some embodiments of the presently disclosed subject matter.

For instance, refer to FIG. 4, which illustrates some fields and specific location(s), in accordance with some embodiments of the presently disclosed subject matter. The subject matter does not limit the number of specific location(s), the number of focusing field(s) and/or the number of investigation field(s) which may be imaged per sample and the number of each shown in FIG. 4 was chosen for simplicity of illustration and may not necessarily be representative. The arrows illustrate a possible scan pattern for the fields. Suppose field 1, field 2, and field 3 are adjacent investigation fields along an axis (e.g. y axis) perpendicular to the optical axis. Field a, field b, and field c may be (adjacent) corresponding focusing fields along the axis (e.g. y axis) perpendicular to the optical axis. It is noted that while in FIG. 4 the investigation fields are shown as squares and the focusing fields and specific fields are shown as circles, other shapes may be used. For example, a square investigation field may be used having a rectangular focusing field spanning a portion of the square from side to side. If the reference relative arrangement for focusing field b has the focal plane one micrometer farther from the vertical midpoint of the sample (in the direction towards imaging module 130) than the reference relative arrangement for focusing field a, then the estimated relative arrangement for focusing field c may include having the focal plane one micrometer farther from the vertical midpoint of the sample (in the direction towards imaging module 130) than the reference relative arrangement for focusing field b. Additionally or alternatively, the estimated relative arrangement may be defined at least partly based on the orientation of the sample holder's internal surface along the optical axis, e.g. a sample holder 125 may be modeled as approximately planar and perpendicular to the optical axis.

If an expected reference range is being defined for a focusing field, the expected reference range for the focusing field may be defined, for instance, at least partly based on the estimated relative arrangement for that focusing field. See above examples regarding definition of a range at least partly based on the estimated relative arrangement.

Additionally or alternatively, the expected reference range for a focusing field may be defined, for instance, at least partly based on experience. For example, the expected reference range may be defined at least partly based on the reference relative arrangement found during the focusing stage for one or more other focusing field(s) which may and/or may not be adjacent to the focusing field, the reference relative arrangement found during the focusing stage for one or more other focusing field(s) which are adjacent to the focusing field, the reference relative arrangement found during the focusing stage for one or more specific locations etc. Referring to FIG. 4, for instance, the expected range for focusing field g may be at least partly based on the reference relative arrangements for focusing fields a, b, c, and g. For example, the expected reference range may span at least a range that covers all of the reference arrangements of each of a, b, c, and g.

It is noted that for any range defined based at least partly on the estimated relative arrangement, the definition basis for one focusing field may not necessarily be the same as for another field. For instance, assuming similar examples including i, j, a, b as discussed above, the i and/or j for a predefined accuracy range and/or the a and/or b for an expected reference range may not necessarily be the same for each focusing field.

In some embodiments, only a relatively small (focusing) field may be imaged during the focusing stage, whereas during the investigation stage a larger (investigation) field may be imaged. Optionally the investigation field that is imaged at the investigation stage may be larger than the focusing field that is imaged at the focusing stage (i.e. the focusing field may represent only a portion of the investigation field). For instance, in FIG. 4 field 1 is larger than field a. Optionally the same field may be captured both during the focusing stage and the investigation stage, but a smaller part of a captured field may be processed in the focusing stage than is processed in the investigation stage. Optionally, the same field may be captured and analyzed both during the focusing stage and the investigation stage.

The duration of the focusing stage may possibly be advantageously shortened if the focusing field imaged at the focusing stage represents only a portion of a corresponding investigation field and/or if a smaller part of the imaged field is processed in the focusing stage than in the investigation stage. This may, for example, reduce the time needed for method 200 by reducing the time needed for processing and/or data transfer. Optionally, the investigation field may completely or partly overlap the focusing field that is imaged at the focusing stage. Optionally one or more investigation field(s) may correspond to the same focusing field, for instance with a plurality of investigation fields each partly or completely overlapping a certain focusing field. It is noted that in FIG. 4 investigation fields are depicted as abutting, non-overlapping square fields. However, any two adjacent investigation fields may abut or may not abut (e.g. may be separated by a distance). Any two adjacent investigation fields may or may not partially overlap. Any investigation field may be of any shape and may not necessarily be square (e.g. may be round or rectangular). Any investigation field may be of any size. In FIG. 4 focusing fields are illustrated as round fields, but any focusing field may be any shape and may not necessarily be round (e.g. may be square or rectangular). Any focusing field may be of any size.

Optionally, two or more stages which are shown in FIG. 2A as being executed sequentially may in some embodiments be executed in parallel. Optionally, method 200 may in some embodiments include more, fewer and/or different stages than illustrated in FIG. 2A. Optionally, stages shown in FIG. 2A may in some embodiments be executed in a different order than illustrated in FIG. 2A.

Figure 2B:
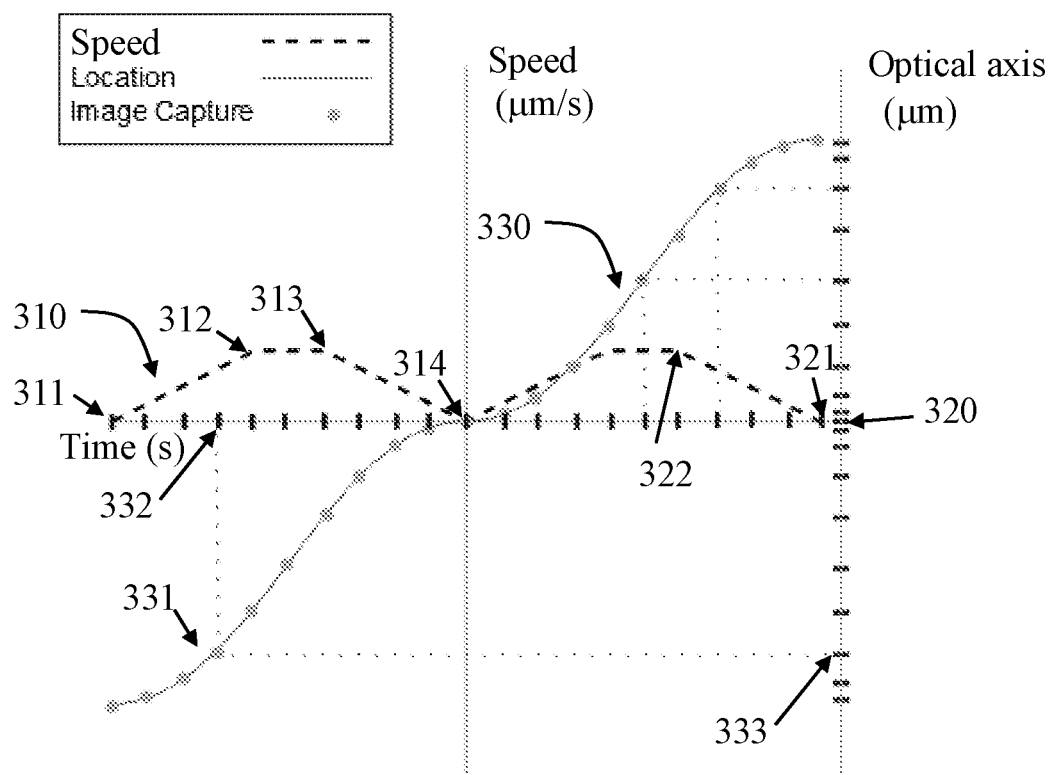
FIG. 2B depicts a schematic graph showing the timing of image capture at a plurality of relative arrangements along an optical axis, in accordance with some embodiments of the presently disclosed subject matter.

An example of some embodiments of method 200 is depicted schematically in FIG. 2B. FIG. 2B depicts a schematic graph showing the timing of image capture at a plurality of relative arrangements along an optical axis, in accordance with some embodiments of the presently disclosed subject matter. In this particular example optical module 132 was kept stationary while sample holder 125 was moved along the optical axis in the direction of the optical module 132 at a varying speed.

The speed of motion is depicted schematically as dashed line 310, plotted against the time and speed axes. In this specific example, motion begins at point 311 and accelerates at a fixed rate until reaching a maximum speed at point 312. This speed is maintained until deceleration commences at point 313. Deceleration continues at a fixed rate until reaching a local minimum value (e.g. momentary stop) at point 314. This point 314 corresponds with the position along the optical axis of the estimated relative arrangement for the given focusing field. After stopping at this position, motion resumes with acceleration, followed by a constant speed and a deceleration phase until reaching a full stop at the end of the motion path at point 321. It is noted that while in this example deceleration and acceleration rates were depicted as being constant and equal (but opposite), these may alternatively be performed at varying rates and/or may not be equal one to the other. It is further noted that while in this example the same speed pattern was mirrored above and below (i.e. before and after) reaching the estimated relative arrangement (point 320), these patterns may alternatively differ.

The positions of sample holder 125 at different time points during this motion are plotted against the time and optical axes as line 330, with points when images were captured schematically shown as grey dots. As shown, each grey dot corresponds to a time point on the time axis and a position along the optical axis. For example, image capture point 331 corresponds to time point 332 (when motion was accelerating) and position 333 on the optical axis. As seen on the time axis, the images were captured at a constant rate. However, as a result of the varying in motion speed, image capture density was increased near the estimated relative arrangement point 320 on the optical axis.

It is noted that while in this example images were taken during the acceleration period between points 311 and 312 as well as during the deceleration period leading to point 321, which resulted in an increased density of image capture during these periods, in some embodiments image capture may commence for example only after maximum speed is reached (point 312) and terminate when deceleration begins at point 322.

Optionally, the image capture density for at least a portion of the optical axis may be defined in relation to the depth of focus (DOF) of the images. DOF is known as the distance between the nearest and farthest objects in a scene (or in a sample) that appear acceptably sharp in an image. DOF is mostly a property of a microscope's lens and the magnification, the latter being determined by the resolution of interest.

Optionally, the image capture density may be such that for at least a portion of the optical axis, every two adjacent images are separated by no more than 3 DOF units. For example, if DOF is in the range of 5 μm, the distance between two adjacent images may be 15 μm or less for at least a portion of the optical axis. Optionally, this portion of the optical axis may span between ±10 DOF units or less along the optical axis about a position of a focal plane associated with the estimated relative arrangement. Optionally, every two adjacent images may be separated by no more than a single DOF unit (e.g. 0.1-0.25 DOF units), along a portion of the optical axis that spans between ±5 DOF units (or even between ±2 DOF units) along the optical axis about a position of a focal plane associated with the estimated relative arrangement. As used herein, two adjacent images are two images along the optical axis that are not separated by any other image(s) along the optical axis.

In order to better appreciate method 200, an example will now be described of a method 500 which includes method 200 or a part thereof. It should be evident that method 200 may be a standalone method or may be part of any method, and at least part of method 200 may not necessarily be included in method 500.

Figure 5:
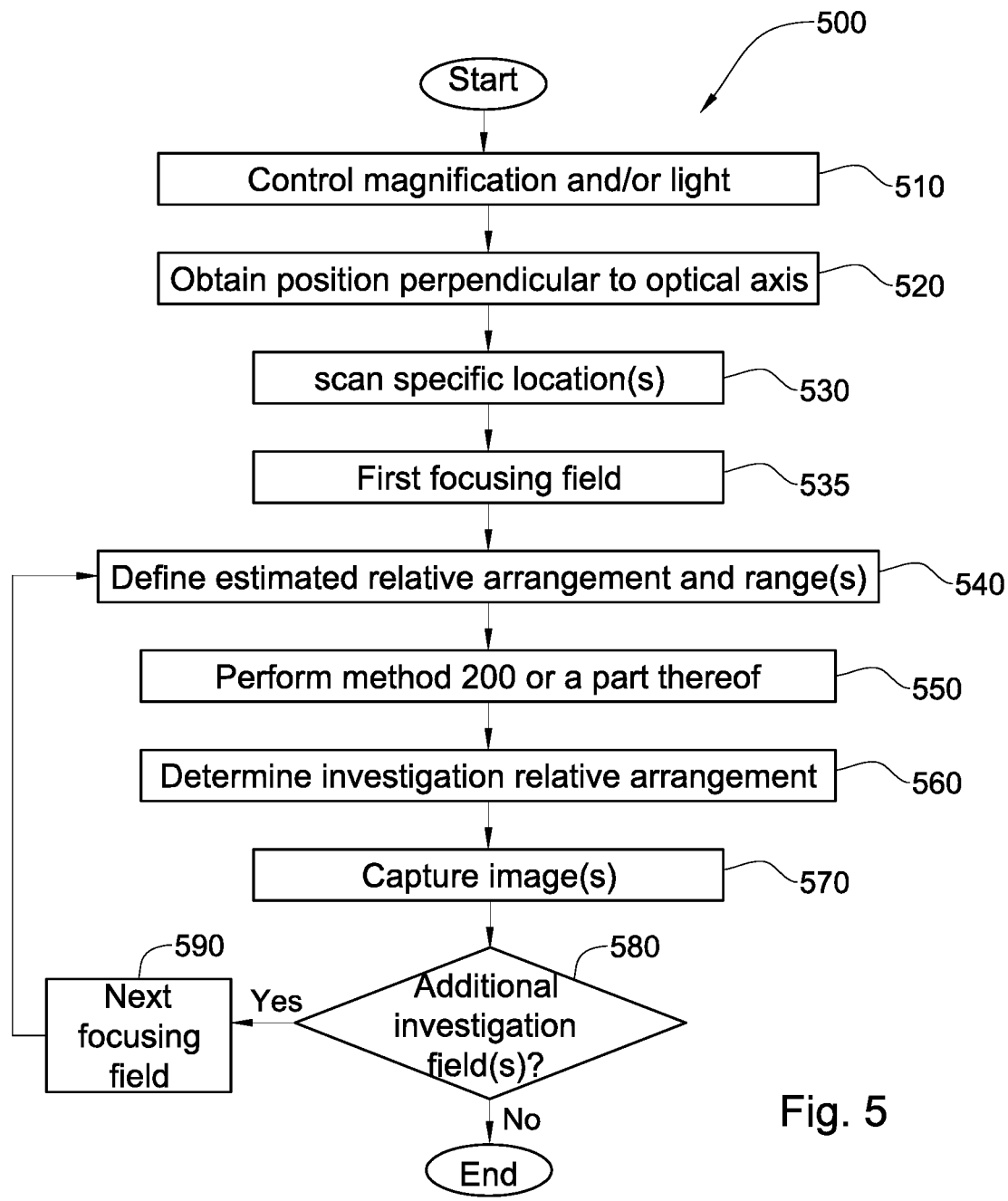
FIG. 5 is a flowchart of a method of examining a sample, in accordance with some embodiments of the presently disclosed subject matter.

FIG. 5 is a flowchart of a method 500 of examining a sample, in accordance with some embodiments of the presently disclosed subject matter.

It is assumed that, for a given sample, captured images may correspond to a plurality of investigation fields (e.g. 300 investigation fields). The investigation fields which are to be imaged for the sample may or may not cover the entire sample. For instance the sample may be a blood sample which is diluted and allowed to settle as a monolayer on a carrier slide, where at least 80% of the cells or even at least 90% of the cells may have direct contact with the surface on which the cell sample is held. The blood may be dyed with Hoechst and/or Acridine Orange.

In the illustrated embodiments, in stage 510 a magnification level and/or a type of light may be controlled (e.g. by a control module such as control module 140, possibly after receiving selection from an input module such as input module 160). Stage 510 may be performed when necessary in method 500 and not necessarily at the beginning or not necessarily only at the beginning of stage 510. For instance, for a focusing stage, any suitable magnification level may be used, for instance 100×, 50× 20×, 10×, etc. In some examples the minimum allowable magnification level may depend at least partly on the staining technique. In some examples it may be advantageous to use low magnification as low magnification may possibly allow an easier and/or faster focusing stage and/or a lower depth of focus (e.g. allowing cheaper less sensitive lenses and/or control module motor, if any). For instance, for a focusing stage, any suitable type of light may be used. For instance, the light may be from a light source module such as light source module 110. In some examples the focusing stage may be performed in brightfield and/or using light at a frequency that does not excite a fluorescent dye present in the sample in order to reduce or prevent photo-bleaching during the performance of method 200. Also, fluorescent images may require longer exposure periods than brightfield.

Figure 6:
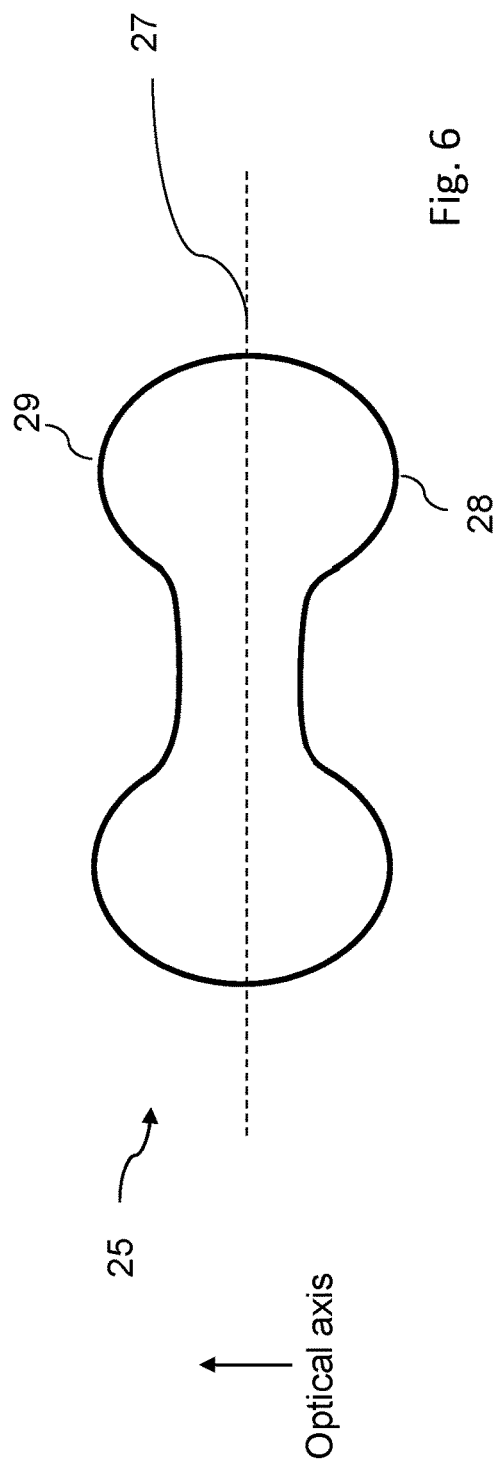
FIG. 6 illustrates a red blood cell, in the context of some embodiments of the presently disclosed subject matter.

It is noted that in brightfield illumination of a whole blood sample, the most visibly abundant object is generally red blood cells. Healthy red blood cells may be characterized by a distinctive biconcave shape as illustrated by FIG. 6 in which a blood cell 25 is depicted, in the context of some embodiments of the presently disclosed subject matter. Blood cell 25 may be characterized as having a midplane 27.

In the illustrated embodiments in stage 520, a position perpendicular to the optical axis (e.g. X-Y position) may be obtained. For instance, sample holder 125 may have two or more positioning/calibration marks on the surface thereof. Such markers may be used to identify the X-Y position of sample holder 125 with respect to imaging module 130 or a portion thereof.

In the illustrated embodiments, in stage 530 at least one specific location of the sample, near and/or at the area to be imaged may be scanned along the optical axis using the maximum range of relative arrangements. This scan may be performed for example near one or more of the extremities of the area (e.g. corners or circumference of a quadrilateral shaped area or the circumference of a circular shaped area, etc.) to be imaged, near a midpoint thereof, and/or at any other location(s). Optionally a plurality of specific locations may be scanned (e.g. four areas near and/or at a corner of a rectangular area to be imaged). The maximum range may or may not equal the maximum range allowed by a given digital microscope system (e.g. digital microscope system 100). In some instances, in stage 530 the maximum range may equal the maximum range allowed by a given digital microscope system and then may be redefined based on a carrier range, as will be explained further below. For each specific location a plurality of images may be captured (e.g. 40 image, 80 images, etc.). The images may or may not be captured so that sequential images necessarily correspond to relative arrangements at a fixed deviation from one another (for example, if the focal plane or sample is moving in one direction along the optical axis then sequential images may be captured at a uniform distance from one another along the optical axis, possibly resulting in uniform image capture density along the optical axis). For each specific location a reference relative arrangement may be determined, and if two or more specific locations are scanned then the two reference relative arrangements which differ most from one another may be selected. These two reference relative arrangements may be used to define a carrier range based at least partly on these two reference relative arrangements and/or to deduce information on the orientation and/or geometry of sample holder 125 in the plane perpendicular to the optical axis (e.g. x-y plane perpendicular to z axis). For instance, the carrier range may be defined as the range between these two reference relative arrangements, or may be defined to be a minimum range (e.g. 100 micrometers or more) which includes these two reference relative arrangements (e.g. at least 25 μm above and below the highest and lowest values, respectively).

Optionally, the reference relative arrangements of any of the specific location(s) may be refined and/or confirmed by performing an additional scan along the optical axis. Optionally this may include defining the reference relative arrangement found in the previous scan of the same specific location to be the estimated relative arrangement and proceeding essentially according to stages 540, 550 and 560 of method 500. Optionally this may include having decreased speed (e.g. of 0) at or in the proximity of the estimated relative arrangement, and/or increased rate of image capture at or in the proximity of the estimated relative arrangement.

Optionally a second scan of a specific location may include using a reference relative arrangement of a previous scan of a specific location as the estimated relative arrangement (or a function of the reference relative arrangements of previous scans of a plurality of specific locations), and having decreased speed (e.g. of 0) at or in the proximity of the estimated relative arrangement and/or increased rate of image capture at or in the proximity of the estimated relative arrangement.

Optionally any of the scans of the specific location(s) may be in accordance with method 200 or a part thereof, including at least one image being captured while the sample and a focal plane are in relative motion along an optical axis at a speed greater than zero.

Information regarding the geometry of the surface of sample holder 125 may be derived using at least two reference relative arrangements that were deduced for specific fields. Based on a pair of specific locations a line may be defined which represents a slant the surface of sample holder 125. Based on three or more specific locations a plane may be defined which represents the surface of sample holder 125. For instance, referring again to FIG. 4, assume that three or more of possible specific locations α, β, γ, δ are scanned. If the relative arrangement of α is characterized by a larger distance between the sample and the focal plane than the relative arrangement of β, and the relative arrangement of γ is characterized by a larger distance between the sample and the focal plane than the relative arrangement of δ, then it may be assumed that the plane of sample holder 125 is slanted such that the fields 1, 8 and 9 are higher than 4 and 5. If the relative arrangement of α is characterized by the same distance between the sample and the focal plane as the relative arrangement of δ but by a larger distance between the sample and the focal plane than the relative arrangement of γ, and the relative arrangement of γ is characterized by the same distance between the sample and the focal plane as the relative arrangement of β, then it may be concluded that surface of sample holder 125 has a peculiar geometry.

The information derived regarding the surface of sample holder 125 may be used in defining an estimated relative arrangement for any field. For example, this information may be included with the reference relative arrangement of one or more adjacent fields. Optionally, the information relating to the surface geometry using the reference relative arrangements of two or more specific locations may be fine-tuned using one or more reference relative arrangements found for other focusing fields in the sample.

Optionally any of the specific location scans may be followed by capturing one or more images at an investigation relative arrangement of a field that overlaps at least in part the specific location (e.g. as part of stage 500). For instance, referring to FIG. 4 if a scan has been taken of γ, then one more images may be taken of overlapping field 9. Optionally any of the specific location(s) may or may not overlap investigation field(s). Optionally any of the specific location(s) may or may not overlap focusing field(s).

Optionally any specific location may be of any shape and/or size and not necessarily as illustrated in FIG. 4.

Optionally the maximum range may be redefined based on the carrier range, for instance by extending the carrier range to include additional relative arrangements. Continuing with this instance, if it is assumed that only the focal plane or sample is moving, the focal plane or sample may be allowed in the maximum range to be, up to say 25 micrometers closer to and/or farther away from a fixed point—e.g. a light source module such as light source module 110—than allowed by the carrier range. In this instance, the redefined maximum range may therefore include relative arrangements in the carrier range and additional relative arrangements. Beginning with a first focusing field (stage 535), in the illustrated embodiments in stage 540, an estimated relative arrangement, an accuracy range, and a relative arrangement range for relative movement along the optical axis may be defined for the field. For instance, these values may be defined by a processing module such as processing module 150. The relative arrangement range may equal, for instance, the maximum range, the carrier range, or the expected reference range. An expected reference range may possibly be allowed to be a narrower range than the carrier range or maximum range since it may be defined at least partly based on the estimated relative arrangement and/or experience. An expected reference range may therefore possibly advantageously enable a shorter focusing stage as discussed above. The estimated relative arrangement may be defined, for instance, at least partly based on reference relative arrangement(s) for other focusing field(s) and/or on information derived regarding the geometry of the surface of sample holder 125 as discussed above. The accuracy range may be defined, for instance, at least partly based on the estimated relative arrangement as discussed above.

In the illustrated embodiments, in stage 550, method 200 or a part thereof may be performed for the focusing field. Assume, for instance, that the relative arrangement range which is initially used in stage 550 may equal the expected relative arrangement range. In this instance, if the determined reference relative arrangement is not located in the accuracy range then stage 550 may be repeated with a wider relative arrangement range, e.g. equaling the maximum range. It is possible that in this instance if the number of repetitions is greater than n (n≥1), an error message may be outputted, for instance via an output module such as output module 170, and method 500 may end or method 500 may iterate back to stage 540 for another focusing field. Once a reference relative arrangement has been determined (after one or more iterations of stage 550), in the illustrated embodiments method 500 may continue to stage 560.

In some examples, the processing to determine the reference relative arrangement in accordance with a reference criterion may include a reference criterion at least partly based on maximum contrast and/or sharpness. Any of a number of functions which may be anticipated to be at a maximum when the image reaches a highest level of sharpness or contrast may be used such as standard deviation, absolute-value deviation from a mean, entropy, differentials (gradient or Laplacian) of an image area, etc.

In some examples, the processing to determine the reference relative arrangement in accordance with a reference criterion may additionally or alternatively include drop in image contrast. Examples regarding a drop in image contrast are described in the aforementioned International Application Number PCT/IL2014/050423 (published as WO 14/188405 to Greenfield). In some examples of the aforementioned application, it is described how a reference may be determined which corresponds to a drop in image contrast. For instance, in some examples of the aforementioned application, using the plurality of images taken along the optical axis, for example according the method 200, a curve may be generated representing the values of an image contrast function (for example image variance) as a function of depth levels along the optical axis. In some examples of the aforementioned application, where image I comprises $\alpha*\beta$ pixels ($\alpha$, $\beta$ integers) of pixel intensity $I_{\gamma,\delta}$ wherein $1 \leq \gamma \leq \alpha$ and $1 \leq \delta \leq \beta$, the image variance may be expressed as follows: $Var(I)=E[(I_{\gamma,\delta}-E(I))^2]$, wherein $E(I)$ is the mean value of the pixel intensity $I_{\gamma,\delta}$ over the example image. In some examples of the aforementioned application, supplemental points on the curve may be interpolated and/or extrapolated, but in some other examples supplemental points may not be interpolated nor extrapolated. In some examples of the aforementioned application, a reference corresponding to a drop in image contrast may be identified, for instance by identifying two maxima in the curve and searching for the lowest point on the curve (the minimum, also referred to as a "well" in the curve) between these two maxima. In some examples of the aforementioned application a curve may not necessarily be generated and the identification of maxima and minima may be performed mathematically. In these examples, interpolation and/or extrapolation of points to be included in the mathematical processing may or may not be performed.

Figure 7:
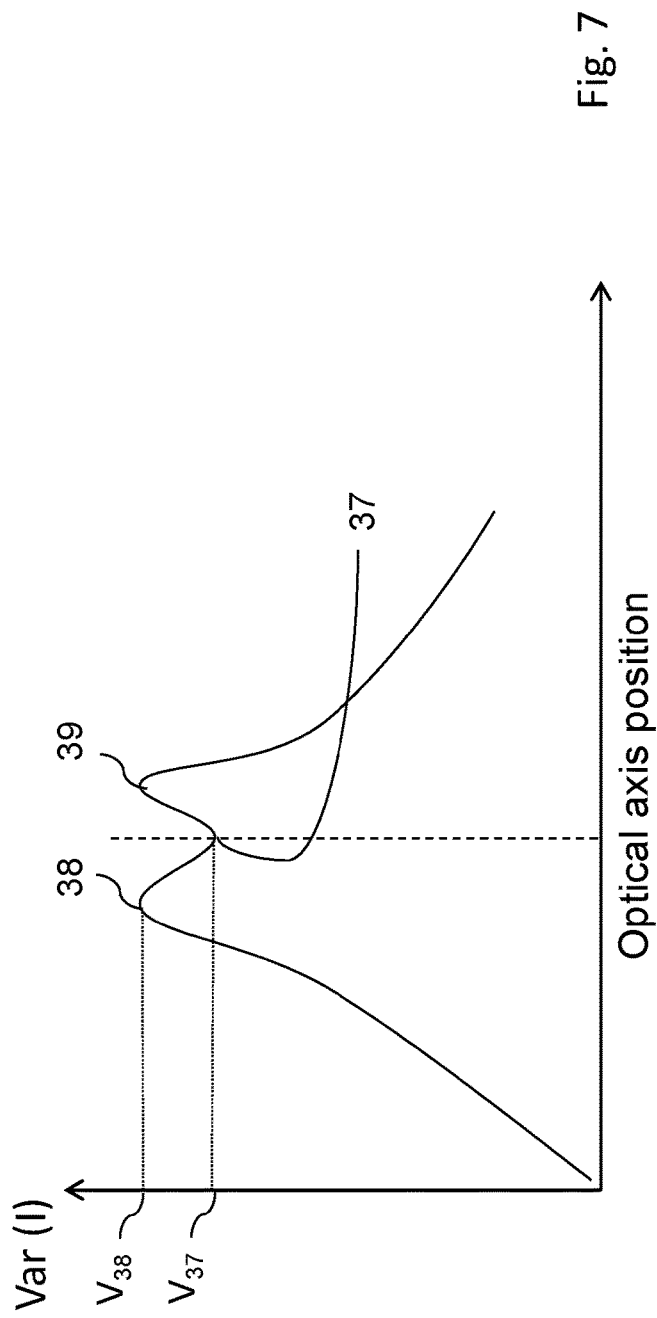
FIG. 7 illustrates a curve representing the values of image contrast function as a function of depth levels, in accordance with some embodiments of the presently disclosed subject matter.

In some examples of the aforementioned application the reference may be verified if the deepness of a well is above a predetermined threshold. In some examples of the aforementioned application, applying contrast-based functions and/or sharpness based functions to brightfield microscopy of a sample (for example a sample containing mostly red blood cells, such as a blood sample) may yield graphs qualitatively similar to that shown in FIG. 7. FIG. 7 illustrates a curve representing the values of image contrast function as a function of depth levels, in accordance with some examples of the aforementioned application. The curve notably comprises a well 37 embraced between two maxima 38, 39 (in this example a saddle point which is a local minimum, but not an absolute (global) one). A value of a depth level described in some examples of the aforementioned application may be an example of a value quantifying a relative arrangement of a focal plane and sample along the optical axis, and therefore FIG. 7 may also be considered to be in accordance with some embodiments of the presently disclosed subject matter. However, values which may quantify relative arrangements are not limited by the presently disclosed subject matter. Therefore in accordance with some embodiments of the presently disclosed subject matter, values of an image contrast function may be plotted and/or mathematically processed as a function of any quantifiable values of relative arrangements (and not necessarily depth levels), if it is desired to identify a reference relative arrangement which corresponds to a drop in image contrast.

In the illustrated embodiments, in stage 560, an investigation relative arrangement may be determined for one or more corresponding investigation field(s), for instance by processing module 150. A corresponding investigation field may be a field which at least partly overlaps the focusing field. For instance in FIG. 4, the only overlapping investigation field shown for focusing field a is investigation field 1 which fully covers focusing field a. However, as mentioned above, it may be possible that a corresponding investigation field may not fully cover the focusing field and/or that there may be more than one corresponding investigation field. The investigation relative arrangement may be defined at least partly based on the reference relative arrangement. For example, in some cases the investigation relative arrangement may be equivalent to the reference relative arrangement. In some other cases, the investigation relative arrangement may be defined as a relative arrangement shifted with respect to the reference relative arrangement. For instance, the shift may be in the range of 0.2-3 micrometers, or about 1-2 micrometers, or about 1.5 micrometers. The manner of determining the shift is not limited by the subject matter, and may be performed in any reasonable automatic, manual, or semiautomatic manner. For instance, the shift may possibly be determined at least partly based on a comparison by eye of images captured under different light types. In some of these cases, the investigation relative arrangement may be shifted if the reference relative arrangement was determined using a drop in image contrast as a reference criterion, so as to increase the contrast and/or sharpness of images captured during the investigation stage.

In the illustrated embodiments, in stage 570 the corresponding investigation field(s) may be imaged, where one or more images may be captured with the relative arrangement of the focal plane and the sample along the optical axis corresponding to the determined investigation relative arrangement. For instance, a control module such as control module 140 may control the relative arrangement so as to correspond to the investigation relative arrangement determined in stage 560, for instance by changing a focal length, moving optical module 132 or a part thereof and/or moving sample holder 125 (e.g. by way of moving and/or adjusting associated carrier module 120), if necessary. It is possible that more than one equivalent position along the optical axis for the focal plane and/or more than one equivalent position along the optical axis for the sample may correspond to the investigation relative arrangement provided the focal plane and a point on the sample are positioned at the appropriate distance and direction from one another along the optical axis. Additionally or alternatively, stage 510 may possibly be performed before and/or during stage 570 with a control module such as control module 140 for instance controlling a light source module such as light source module 110 for instance to allow images to be taken in different lights (e.g. one image in each of brightfield and Hoechst, and two images in fluorescent light). Additionally or alternatively, if the magnification level is to be changed, a control module such as control module 140 may for instance control optical module 132 to change the magnification level (e.g. 100 s, 50×, 20, 10×, etc.). The rate of image capture in stage 570 is not limited by the disclosure. Optionally a plurality of investigation fields may be imaged at the investigation stage based on a reference relative arrangement that was defined for a given scanned field. If a plurality of investigation fields is imaged, each of the plurality of investigation fields may overlap, at least partially, the focusing field that was used to define the reference relative arrangement in part or entirely.

Optionally, motion detection may be performed by comparing two fluorescent images captured consecutively. The comparison may allow the differentiation between stationary parasites and potentially false positive motile elements (e.g. platelets).

In the illustrated embodiments, in stage 580 it is determined whether the last investigation field, which was supposed to be imaged for the sample, has been imaged. If not, then in the illustrated embodiments, for the next focusing field (stage 590) method 500 iterates back to stage 540. Optionally, stage 510 may be performed to control magnification and/or light, as necessary. If, instead, the last investigation field which was supposed to be imaged has indeed been imaged, then in the illustrated embodiments, method 500 may end. The disclosure does not limit the order in which fields may be handled in method 500.

In some embodiments, method 500 may possibly advantageously allow a whole slide of blood (e.g. reflecting 0.5 µl of blood) to be scanned in much less time than conventionally (e.g. less than 5 minutes compared to conventional 40 minutes).

Optionally, two or more stages which are shown in FIG. 5 as being executed sequentially may, in some embodiments, be executed in parallel. Optionally, method 500 may in some embodiments include more, fewer and/or different stages than illustrated in FIG. 5. Optionally, stages may in some embodiments be executed in a different order than illustrated in FIG. 5. For instance, stages 540 and 550 (and optionally 560) may be performed for a plurality of (or even all of the) focusing fields before proceeding to stage 560 or 570 for corresponding investigation fields It will also be understood that the subject matter contemplates that a system or part of a system disclosed herein may, for example, comprise and/or be comprised in a computer. Likewise, the subject matter contemplates, for example, a computer program being readable by a computer for executing a method or part of a method disclosed herein. Further contemplated by the subject matter, for example, is a computer-readable medium tangibly embodying program code readable by a computer for executing a method or part of a method disclosed herein.

The term "non-transitory" is used to exclude transitory, propagating signals, but to otherwise include any volatile or non-volatile computer memory technology suitable to the application. For instance, a computer program product may comprise a non-transitory computer useable medium.

While embodiments of the subject matter have been shown and described, the subject matter is not thus limited. Numerous modifications, changes and improvements within the scope of the subject matter will now occur to the reader.

The invention claimed is:

1. Apparatus for use with an output device, and a blood sample that was drawn from a subject, and that was stained with at least one stain, the apparatus comprising:
    a microscope system configured to acquire first and second images of the blood sample at respective times, at a given microscope focusing field; and
    a computer processor configured to:
    for the given microscope focusing field, receive an estimated relative arrangement between a focal plane of the microscope and the blood sample, the estimated relative arrangement being an estimate of an optimum relative arrangement between the focal plane of the microscope and the blood sample at which to acquire the first and second images of the blood sample,
    determine an optimum relative arrangement between the focal plane of the microscope and the blood sample at which to acquire the first and second images of the blood sample, by:
        driving the microscope to capture a plurality of overlapping images of the sample at the given microscope focusing field, while a relative arrangement between the sample and the focal plane of the microscope varies, the capturing of the plurality of overlapping images being performed by varying a rate of image capture by the microscope, as the relative arrangement between the sample and the focal plane varies, such as:

to provide an increased image capture density when a current relative arrangement between the focal plane of the microscope and the sample, along the optical axis, is closer to the estimated relative arrangement, and to capture images, but to provide a decreased image capture density when the current relative arrangement between of the microscope the focal plane and the sample, along the optical axis, is farther from the estimated relative arrangement; and analyzing the plurality of overlapping images;

identify in the first and second images, a given entity that was stained with the at least one stain, determine whether, between acquisitions of the first and second images, there was motion of the given entity within the sample, by comparing the first and second images to one another, at least partially in response thereto, distinguish between the given entity being a platelet by determining that the given entity is a motile entity, and the given entity being a parasite by determining that the given entity is a stationary entity, and generate an output on the output device, at least partially in response thereto.

2. The apparatus according to claim 1, wherein the microscope system is configured to acquire first and second images of the blood sample at respective times by acquiring first and second fluorescent images of the blood sample at respective times.

3. The apparatus according to claim 1, wherein the computer processor is configured to drive the microscope to vary the rate of image capture by increasing a rate of image capture to provide an increased rate when a current relative arrangement between the focal plane and the sample is a relative arrangement selected from the group consisting of: a relative arrangement corresponding to the estimated relative arrangement, and a relative arrangement in proximity to the estimated relative arrangement.

4. The apparatus according to claim 1, wherein the computer processor is configured to drive the microscope to vary the rate of image capture by decreasing a rate of image capture to provide a decreased rate when the current relative arrangement between the focal plane and the sample corresponds to a relative arrangement other than the estimated relative arrangement.

5. The apparatus according to claim 1, wherein the computer processor is configured to drive the microscope to vary the rate of image capture by increasing a rate between image capture before the current relative arrangement of the focal plane and the sample corresponds to the estimated relative arrangement and decreasing a rate of image capture after the current relative arrangement between the focal plane and the sample corresponds to the estimated relative arrangement.

6. The apparatus according to claim 1, wherein the computer processor is configured to drive the microscope to vary the rate of image capture by increasing a rate between image capture as the current relative arrangement of the focal plane and the sample grows closer to the estimated relative arrangement and decreasing a rate of image capture as the current relative arrangement between the focal plane and the sample moves away from the estimated relative arrangement.

7. The apparatus according to claim 1, wherein the computer processor is configured to drive the microscope to capture at least one of the plurality of overlapping images of the sample at the given microscope focusing field while a speed of relative motion of the focal plane and the sample along the optical axis is greater than 10 μm/s.

8. The apparatus according to claim 1, wherein the computer processor is configured to drive the microscope to capture the plurality of overlapping images of the sample at the given microscope focusing field, while the relative arrangement between the sample and the focal plane of the microscope varies, at least partly by modifying a focal length of the microscope.

9. The apparatus according to claim 1, wherein the computer processor is configured to drive the microscope to capture the plurality of overlapping images of the sample at the given microscope focusing field, while the relative arrangement between the sample and the focal plane of the microscope varies, at least partly by moving a sample holder in which the blood sample is housed.

10. The apparatus according to claim 1, wherein the computer processor is configured to determine the optimum relative arrangement between the focal plane and the blood sample along the optical axis at which to acquire the first and second images of the blood sample by identifying a relative arrangement between the focal plane and the blood sample along the optical axis at which there is a drop in image contrast relative to another relative arrangement between the focal plane and the blood sample along the optical axis.

11. A method for use with an output device, and a blood sample that was drawn from a subject, and that was stained with at least one stain, the method comprising:

acquiring first and second microscopic images at a given focusing field of the blood sample at respective times; and using a computer processor:

for the given microscope focusing field, receiving an estimated relative arrangement between a focal plane of the microscope and the sample, the estimated relative arrangement being an estimate of an optimum relative arrangement between the focal plane of the microscope and the sample at which to acquire investigative microscopic images of the sample; and determining an optimum relative arrangement between the focal plane of the microscope and the sample at which to acquire investigative microscopic images of the sample, by:

capturing a plurality of overlapping images of the sample at the given microscope focusing field, while a relative arrangement between the sample and the focal plane of the microscope varies, the capturing of the plurality of overlapping images being performed by varying a rate of image capture by the microscope, as the relative arrangement between the sample and the focal plane varies, such as:

to provide an increased image capture density when a current relative arrangement between the focal plane of the microscope and the sample, along the optical axis, is closer to the estimated relative arrangement, and to capture images, but to provide a decreased image capture density when the current relative arrangement between of the microscope the focal plane and the sample, along the optical axis, is farther from the estimated relative arrangement; and analyzing the plurality of images;

identify in the first and second images, a given entity that was stained with the at least one stain, determining whether, between acquisitions of the first and second images, there was motion of the given entity within the sample, by comparing the first and second images to one another;

at least partially in response thereto, distinguishing between the given entity being a platelet by determining that the given entity is a motile entity, and the given entity being a parasite by determining that the given entity is a stationary entity; and generating an output on the output device, at least partially in response thereto.

12. The method according to claim 11, wherein acquiring the first and second images of the blood sample at respective times comprises acquiring first and second fluorescent images of the blood sample at respective times.

\* \* \* \* \*